United States Patent [19]

Sugikawa

[11] Patent Number: 5,531,955
[45] Date of Patent: Jul. 2, 1996

[54] METHOD OF MANUFACTURING A METALLIC POROUS SHEET HAVING PORES SURROUNDED BY A THREE-DIMENSIONAL NET-SHAPED FRAMEWORK OF METALLIC LAYERS

[75] Inventor: Hirofumi Sugikawa, Toyonaka, Japan

[73] Assignee: Katayama Special Industries, Ltd., Osaka, Japan

[21] Appl. No.: 385,422

[22] Filed: Feb. 8, 1995

Related U.S. Application Data

[62] Division of Ser. No. 305,351, Sep. 13, 1994, Pat. No. 5,496,650.

[30] Foreign Application Priority Data

Sep. 14, 1993 [JP] Japan .................................. 5-229283
Sep. 14, 1993 [JP] Japan .................................. 5-229284
Oct. 26, 1993 [JP] Japan .................................. 5-267591

[51] Int. Cl.$^6$ ............................................. H05K 3/10
[52] U.S. Cl. .................. 419/2; 419/5; 419/8; 419/35; 419/65; 148/518; 427/531
[58] Field of Search ....................... 419/2, 5, 8, 35, 419/65; 148/518; 427/523, 525, 531

[56] References Cited

U.S. PATENT DOCUMENTS

| | | | |
|---|---|---|---|
| 3,775,176 | 11/1973 | Cross et al. ........................... | 117/227 |
| 4,454,168 | 1/1984 | Fritz ........................................ | 427/96 |
| 4,470,883 | 9/1984 | Eichelberger et al. ................. | 204/15 |
| 4,470,893 | 9/1984 | Oda et al. .............................. | 204/129 |
| 4,487,811 | 12/1984 | Eichelberger et al. ............... | 428/546 |
| 4,848,348 | 7/1989 | Craighead ............................. | 128/639 |
| 5,108,555 | 4/1992 | Nishimuro et al. ................... | 205/184 |

Primary Examiner—Donald P. Walsh
Assistant Examiner—Daniel Jenkins
Attorney, Agent, or Firm—Sughrue, Mion, Zinn, Macpeak & Seas

[57] ABSTRACT

Process of imparting conductivity to a three-dimensional net-shaped porous sheet can be performed efficiently before carrying out electroplating process. Fine metallic powders are applied to the porous sheet made of a foamed sheet, a nonwoven sheet, a mesh sheet or a plurality of sheets layered one on the other, so that a conductive metallic layer is formed on the porous sheet. Then, an electroplated layer is formed on the surface of the conductive metallic layer. The conductive metallic layer remains when the porous sheet burned out. Consequently, a metallic layer of the conductive metallic layer and the electroplated layer forms the metallic framework of the metallic porous sheet.

21 Claims, 19 Drawing Sheets

METHOD OF MANUFACTURING A METALLIC POROUS SHEET HAVING PORES SURROUNDED BY A THREE-DIMENSIONAL NET-SHAPED FRAMEWORK OF METALLIC LAYERS

This is a divisional of application No. 08/305,351 filed Sep. 13, 1994, now U.S. Pat. No. 5,496,650.

BACKGROUND OF THE INVENTION

1. Field of the Invention

The present invention relates to a metallic porous sheet and a method of manufacturing the metallic porous sheet, and more particularly, to a method of manufacturing a metallic porous sheet by using a three-dimensional net-shaped porous sheet consisting of a foamed sheet, a non-woven sheet, a mesh sheet or a plurality of sheets layered one on the other by combining at least two of the above three types of sheets with each other. The metallic porous sheet is used as an electrode plate of a nickel cadmium battery, a nickel hydrogen battery, a lithium battery, a fuel battery or a battery plate for use in a car by charging activating powders into pores of the metallic porous sheet.

2. Description of the Related Arts

The present applicant proposed metallic porous sheets to be used as an electrode plate of a battery. The proposed porous sheet consists of a foamed sheet, a nonwoven sheet, a mesh sheet or a plurality of sheets layered one on the other by combining at least two of the above three types of sheets with each other. The porous sheet is formed into a metallic porous sheet by electroplating (Japanese Laid-Open Patent Publication Nos. 1-290792 and 3-130393).

If the foamed material, the nonwoven sheet or the mesh sheet to be used as the base material of the metallic porous sheet consists .of an organic substance such as synthetic resin, natural fiber, cellulose, paper or the like; or an inorganic substance such as glass or the like, it is necessary to impart conductivity to the base material. It is preferable to impart conductivity to the base material even though the base material is made of metal.

As methods of imparting conductivity to the base material, carbon is applied to the surface of the base material or the surface of the porous sheet is coated with a conductive material such as metal by chemical plating or vaporization.

The conventional method of imparting conductivity to the base material has the following problems:

(a) Vaporization

It is necessary to perform vaporization in a vacuum device. It is uneasy to evaporate metal over the porous sheet in the vacuum device while it is being transported continuously along a transport path, because air leakage occurs at the entrance or the exit of the vacuum device. Thus, it is difficult to maintain vacuum state. Further, it is necessary to prepare a large equipment and manufacturing cost becomes high and further, it takes much time to impart conductivity to the porous sheet.

(b) Chemical Plating Method

A large number of processes is required to perform chemical plating method and a great number of chemicals is required to be managed. In particular, it costs high to prepare a device for treating waste solution. In addition, the chemicals cost high.

(c) Carbon Applying Method

Although this method is less expensive than vaporization method and chemical plating method, a lot of carbon remains as impurity on the surface of the base material. Further, the electric resistance of a conductive layer formed on the base material is as high as 100–200 $\Omega$/cm. Thus, it is difficult to perform electroplating process at high current. In order to obtain high current, it is necessary to run a line for transporting the base material at a slow speed, for example, as slow as 0.1–0.5 m/minute to prevent the base material from being burnt.

Of the above three methods, carbon applying method is mainly adopted because the execution of this method is less expensive than that of the other two methods.

This method has, however, disadvantage that the electric resistance of the conductive layer is high and thus the line for transporting the base material is traveled at a slow speed.

Accordingly, in order to increase productivity by driving the line for transporting the base material at a high speed, it is necessary to reduce the electric resistance of the conductive layer to less than 30 $\Omega$/cm so as to obtain high current in the electroplating process to be performed subsequently to conductivity-imparting process.

Further, carbon applied to the surface of the base material to impart conductivity thereto is not completely eliminated by burning out of carbon and resin and sintering metal plated on the carbon, but a small amount of carbon remains on the surface of the base material.

In forming the metallic porous sheet by using a base material consisting of a resin sheet, it is necessary for an electroplated layer to have a required metallic amount totally. Therefore, electricity rate becomes high and it takes a long time to electroplate the conductive metallic layer. Thus, the metallic porous sheet cannot be manufactured with a high productivity and at a low cost.

SUMMARY OF THE INVENTION

It is accordingly an object of the present invention to provide a novel conductivity-imparting method and a metallic porous sheet manufactured by the conductivity-imparting method.

That is, according to the present invention, fine metallic powders are applied to the surface and the pores of a porous sheet have been allowed to be conductive by the conductivity-imparting method, so as to form a conductive metallic layer. The fine metallic powders have a low electric resistance, and thus a high current is provided in electroplating process to be carried out subsequent to the conductivity-imparting process. Further, in the process of burning out resin to be performed subsequent to electroplating process, the conductive metallic layer withstands heat and remains as the constituent material of the framework of the metallic porous sheet. Consequently, the electroplated layer can be allowed to be formed in a smaller thickness on the conductive metallic layer.

Further, when fine metallic powders are applied to the surface of the porous sheet via adhesive agent, conductive metallic layer can be formed on the surface of the porous sheet in a required metal amount without depositing the electroplate layer on the conductive metallic layer.

In accomplishing these and other objects of the present invention, there is provided a first type metallic porous sheet comprising a three-dimensional net-shaped framework surrounding pores. The framework comprises a conductive metallic layer consisting of fine metallic powders and a metallic electroplated layer formed on the conductive metallic layer.

There is provided a second type metallic porous sheet comprising a three-dimensional net-shaped framework surrounding pores. The framework comprises a conductive metallic layer consisting of fine metallic powders.

The sizes of the fine metallic powders are less than 6.0 µm.

The fine metallic powders consist of fine powders of at least one of Ni, NiO, Cu, Ag, Al, Fe, Zn, Sn, Au, In, P and Cr, or mixture of two or more thereof.

The fine metallic powders are immersed in solution containing metallic ions so as to coat the surface of the powders and penetrate into the powders. The metallic ions consist of at least one of Ni, Cu, Ag, Fe, Zn, Sn, Au and In.

Conductivity is imparted to the fine metallic powders by subjecting a porous sheet to be used as the base material of the metallic porous sheet to activation and/or replacement treatments before the fine metallic powders are applied to the porous sheet. Conductivity may be imparted to the fine metallic powders by subjecting the porous sheet to activation and/or replacement treatments after they are applied to the porous sheet.

In order to improve the conductivity of the fine metallic powders, it is preferable to stir mixture of the fine metallic powders and metallic powders of Au, Ag, Cu or In, etc. put in a ball mill so as to apply the metallic powders of Au, Ag, Cu or In, soft, conductive and not readily oxidized, under pressure to the surfaces of the fine metallic powders.

If the fine metallic powders consist of Cu or Ag which is very conductive, they are not necessarily subjected to the activation and/or replacement treatments. It is preferable to use the fine metallic powders of at least one of Ni, NiO, Cu, Ag, Al, Fe, Zn, Sn, P and Cr, or mixture of two or more thereof to which metallic powders of one of Au, Ag, Cu and In very conductive and not readily oxidized have been applied under pressure.

As fine metallic powders, it is preferable to use one of flake-shaped metallic powders, the thicknesses of which are 0.02–2.0 µm and the surface lengths of the longer sides of which are 0.2–10.0 µm, ultrafine metallic powders, the diameters of which are 0.02–1.0 µm and pulverized metallic powders, the diameters of which are 1.0–6.0 µm. It is possible to use the fine metallic powders consisting of mixture of at least two of the above three kinds of metallic powders.

It is preferable to compose a metallic layer by laminating, one on the other, at least two of the metallic layer of the flake-shaped metallic powders, the ultrafine metallic powders, and the pulverized metallic powders. It is also preferable to compose a metallic layer by laminating, one on the other, the metallic layer consisting of mixture of the above three kinds of metallic powders and the metallic layer consisting of one of the three metallic powders.

Preferably, the metallic layer of the flake-shaped metallic powders or the mixed metallic layer containing the flake-shaped metallic powders is disposed on the outer side of the metallic layer formed by laminating a plurality of metallic layers one on the other.

The conductive metallic layer consisting of the fine metallic powders is provided on the surface of the framework of a three-dimensional net-shaped porous sheet consisting of a foamed sheet, a nonwoven sheet, a mesh sheet or a plurality of sheets layered one on the other by combining at least two of the foamed sheet, the nonwoven sheet, the mesh sheet with each other. That is, as will be described later in detail On the method of manufacturing the metallic porous sheet, the porous sheet is burned out from the metallic layer of the fine metallic powders after the fine metallic powders are applied to the surface of the three-dimensional net-shaped porous sheet (and the metallic layer is electroplated as necessary). The porous sheet may not be burned out.

An activating substance is charged into the pores to use the metallic porous sheet according to the present invention as a battery plate.

The first method of manufacturing the metallic porous sheet according to the present invention comprising a three-dimensional net-shaped framework surrounding pores comprises the steps of forming a conductive metallic layer by applying fine metallic powders to all surfaces of a three-dimensional net-shaped porous sheet including surfaces, of the framework, defining the pores by using adhesive agent; and forming a metallic plated layer on the conductive metallic layer by electroplating the surface thereof. It is preferable to heat the porous sheet on which the conductive metallic layer and the metallic plated layer have been formed so as to burn out the porous sheet and the adhesive agent from the metallic layers thus formed; and sinter the conductive metallic layer and the metallic plated layer after completing the formation of the conductive metallic layer and the metallic plated layer. Instead, it is possible to heat and burn out the porous sheet and the adhesive agent after the conductive metallic layer has been formed, plate the metal on the conductive metallic layer, then sinter the conductive metallic layer and the metallic plated layer. Further, the metal may be plated again on the surface of the metallic plated layer after the sinter thereof.

The second method of manufacturing a metallic porous sheet comprising a three-dimensional net-shaped framework surrounding pores comprises the steps of forming a conductive metallic layer by applying fine metallic powders to all surfaces of a three-dimensional net-shaped porous sheet including surfaces, of the framework, defining the pores by using adhesive agent; heating the porous sheet so as to burn out the porous sheet and the adhesive agent from the conductive metallic layer thus formed; and sintering the conductive metallic layer.

The three-dimensional net-shaped porous sheet to be used in the first and second methods consists of a foamed sheet, a nonwoven sheet, a mesh sheet or a plurality of sheets layered one on the other by combining at least two of the foamed sheet, the nonwoven sheet, the mesh sheet with each other.

The foamed sheet consists of polyurethane sponge, etc. Preferably, the thickness of which is 0.5–5.0 mm, the pore diameters thereof are 50–500 µm, and pores are formed on the foamed sheet at a percentage of 50–99.

The nonwoven sheet and the mesh sheet are made of synthetic resin such as polyester, polypropylene, polyurethane and the like; organic materials such as natural fiber, cellulose, paper and the like; inorganic materials such as metal, glass, carbon and the like.

The mesh sheet has a braided structure composed of braided warps and wefts or one or a plurality of threads braided in a fiber-shaped configuration. The mesh sheet having 2–200-mesh is preferably used.

Preferably, the thread of the mesh sheet and the nonwoven sheet are composed of threads, the diameters of which are 0.01–1.0 mm and have pores at a percentage of 40–99 thereon. The conductive metallic layer and the metal-plated layer are formed while the porous sheet formed as a continuous sheet is being transported along a transport path.

The conductive metallic layer is formed by applying organic adhesive agent to the porous sheet and then applying the fine metallic powders to the organic adhesive agent. The fine metallic powders are uniformly attached to all the surfaces, including the surface of the porous sheet and the surfaces of the framework or skeleton defining the pores, by spraying the fine metallic powders to the surface of the organic adhesive agent applied to the porous sheet and then, penetrating the fine metallic powders into the porous sheet in a thickness direction thereof with a vibrator and/or an air knife.

The conductive metallic layer is formed by applying slurry comprising the fine metallic powders and organic adhesive agent mixed with each other to all the surfaces including the surface of the porous sheet and the surfaces of the framework defining the pores.

The slurry may be applied to the porous sheet by a spray; by rolls immersed in the slurry; by rolls having the slurry supplied to surfaces thereof; or through a screen installed on peripheral surfaces of rolls into which the slurry has been supplied.

The adhesive agent and the fine metallic powders and/or the slurry comprising the fine metallic powders and the adhesive agent mixed with each other are applied to the porous sheet from both surfaces thereof. Further, the slurry comprising the fine metallic powders, adhesive agent and ion absorbent mixed with each other may be applied to the porous sheet.

The adhesive agent is applied to the surface of the conductive metallic layer before the surface of the conductive metallic layer is electroplated.

When the conductive metallic layer is formed on the porous sheet by applying fine metallic powders thereto by the method according to the present invention, the conductive metallic layer has an electric resistance of as low as 1–8 $\Omega$/cm which is lower than the upper limit of the electric resistance 30 $\Omega$/cm required in electroplating the conductive metallic layer. Thus, the conductive metallic layer can be electroplated at a high current. Accordingly, it is possible to electroplate the conductive metallic layer in a predetermined thickness at a higher speed after the conductive metallic layer is formed. In this manner, the method according to the present invention allows the metallic porous sheet to be manufactured with a high efficiency.

In the conventional method, conductive carbon or conductive agent is applied to the surface of the porous sheet in order to impart conductivity to the surface of the porous sheet. The conductive agent is, however, eliminated when it is heated to burn out the porous sheet. Thus, according to the conventional method, it is necessary for an electroplated layer to have a required metallic amount totally. Recently, the formation of pores having large volumes in the metallic porous sheet is demanded to charge a great amount of activating powders thereinto. Consequently, the reduction of the amount of a metal to be deposited on the conductive metallic layer is required. Recently, the metallic layer to be attached to the porous sheet is changing from 600 g/m$^2$ to 420 g/m$^2$. Supposing that the amount of the conductive metallic layer which attaches to the porous sheet is 100 g/m$^2$, the amount of metal to be deposited on the conductive metallic layer is 320 g/m$^2$ which is about half of 600 g/m$^2$. According to the present invention, the amount of metal to be electroplated on the conductive metallic layer can be reduced because the conductive metallic layer remains as the framework of the three-dimensional net-shaped metallic porous sheet to be manufactured although the conductive metallic layer is heated to burn out resin or the base material and sintered. Accordingly, the deposition amount of the electroplated layer is set to the difference obtained by subtracting the amount of the conductive metallic layer from the predetermined total amount of the metallic layer to be formed on the surface of the porous sheet. Consequently, electroplating can be accomplished in a smaller electricity rate and in a shorter period of time. Thus, the metallic porous sheet can be manufactured with a high productivity and at a low cost.

A metallic layer can be formed in a required amount on the porous sheet without forming an electroplated metallic layer. That is, merely the treatment for imparting conductivity to the fine metallic powders allows the metallic layer to be formed in a required amount on the porous sheet. Consequently, the metallic porous sheet can be manufactured at a much lower cost and with a high productivity because it is unnecessary to perform electroplating.

Methods of applying the fine metallic powders to the porous sheet and immersing the porous sheet in adhesive agent are selected depending on the kind of the base material composing the porous sheet, namely, a foamed sheet, a nonwoven sheet, a mesh sheet, and a plurality of sheets layered one on the other by combining at least two of the foamed sheet, the nonwoven sheet, the mesh sheet: with each other. In applying slurry containing the fine metallic powders and adhesive agent, the viscosity of the slurry is adjusted to reliably form the conductive metallic layer on the entire surface of the porous sheet including the upper and lower surfaces thereof and surfaces, of the framework of the porous sheet, defining the pores.

In the conventional method, carbon conventionally used to impart conductivity to the porous sheet remains on the surface of the porous sheet as impurity when it has been heated to burn out resin or the base material and when sintering is performed, whereas according to the present invention, no impurity is left on the framework of the porous sheet. Accordingly, the porous sheet manufactured according to the method of the present invention has a high quality and thus can be used as a superior battery plate.

BRIEF DESCRIPTION OF THE DRAWINGS

These and other objects and features of the present invention will become clear from the following description taken in conjunction with the preferred embodiments thereof with reference to the accompanying drawings, in which:

FIGS. 24A, 24B, 23C, and 24D are sectional views showing still another example of the arrangement of fine metallic powders;

DETAILED DESCRIPTION OF THE INVENTION

Figure 1:
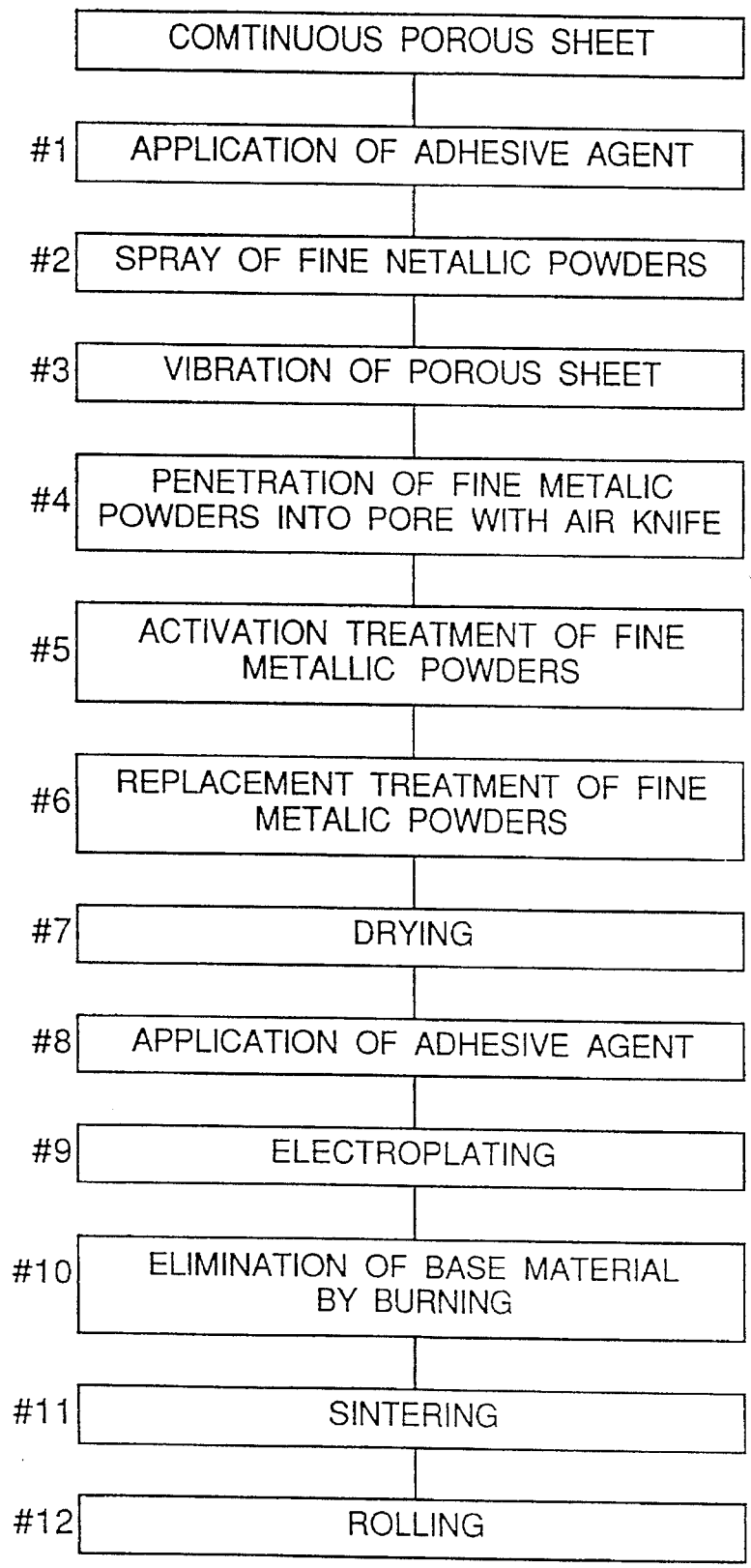
FIG. 1 is a flowchart showing the process of manufacturing a metallic porous sheet according to a first embodiment of the present invention.

Before the description of the present invention proceeds, it is to be noted that like parts are designated by like reference numerals throughout the accompanying drawings.

A metallic porous sheet according to a first embodiment of the present invention is described below with reference to FIGS. 1 through 9.

Figure 2:
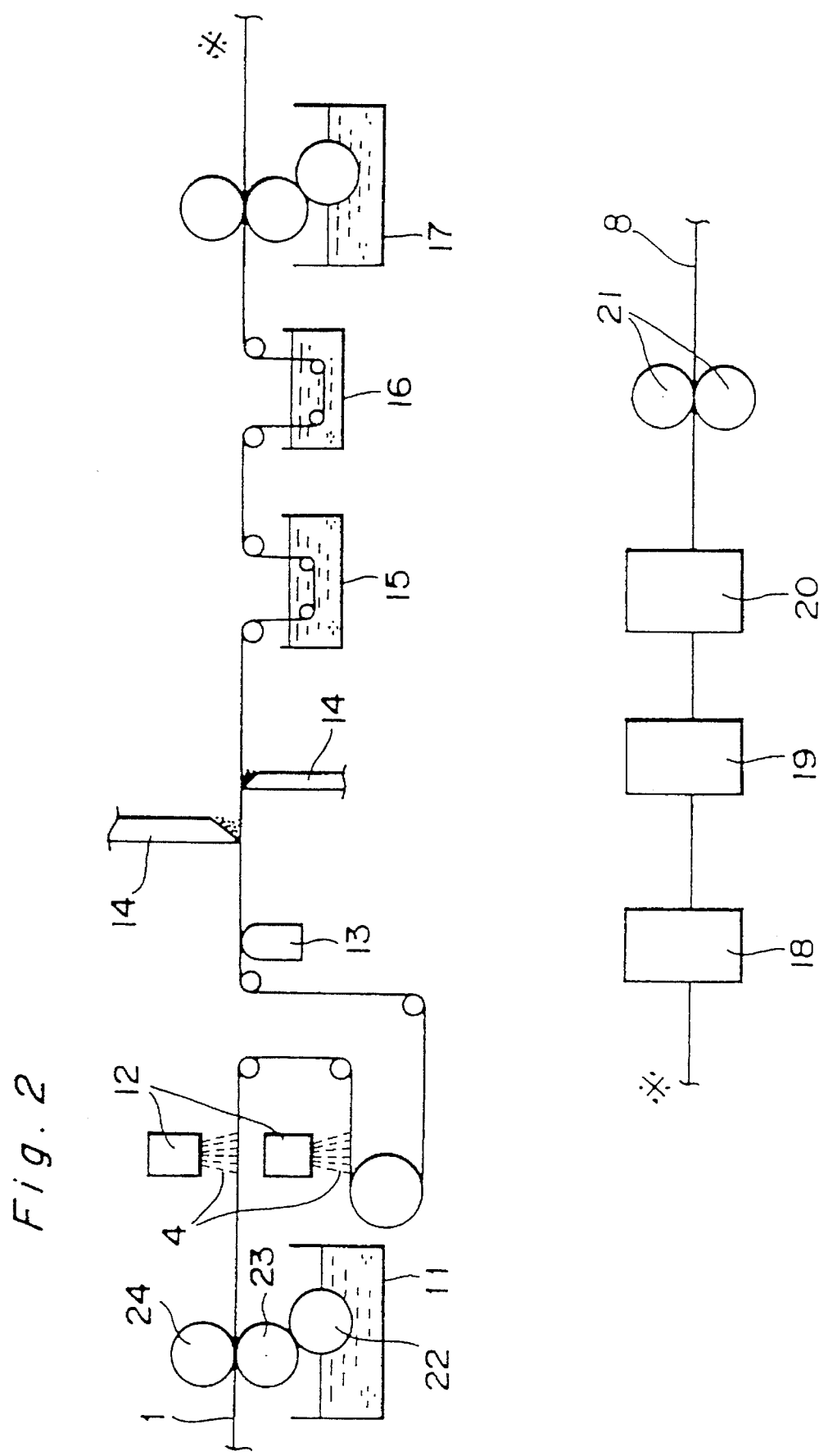
FIG. 2 is a schematic view showing the process of manufacturing the metallic porous sheet according to the first embodiment and devices to be used in the first embodiment.

As shown in FIG. 1 which is a flowchart showing the manufacturing process according to the first embodiment and in FIG. 2 schematically showing the manufacturing process and devices to be used in the first embodiment, the base material of the metallic porous sheet consists of a three-dimensional net-shaped porous sheet 1 consisting of a foamed sheet, a nonwoven sheet, a mesh sheet or a plurality of sheets layered one on the other by combining at least two of the above three types of sheets with each other. The porous sheet 1 is continuous and thus transported to be treated in a continuous process.

During the transport of the porous sheet 1, initially, at step #1 of FIG. 1, in an adhesive agent bath 11 storing the organic adhesive agent 2, the organic adhesive agent 2 is applied to the upper and lower surfaces of the porous sheet 1 and surfaces, of a framework of the porous sheet 1, defining pores as will be described in detail later.

Then, at step #2, fine metallic powders 4, the size of which are smaller than 6.0 μm are jetted from a powder jetting device 12 disposed along a porous sheet-transport path to apply them to the organic adhesive agent 2. Preferably, the sizes of the fine metallic powders 4 are smaller than 1.0 μm. After the fine metallic powders 4 are applied to the upper surface of the porous sheet 1, the porous sheet 1 is turned upside down on the porous sheet-transport path to apply the fine metallic powders 4 to the lower surface thereof as well. As the fine metallic powders 4, fine powders of Ni, NiO, Cu, Ag, Al, Fe, Zn, Sn, Au, In, P and Cr, or mixture of two or more thereof is preferably used.

Only the application of the fine metallic powders 4 to the porous sheet 1 by means of the powder jetting devices 12 may lead to a nonuniform distribution of the fine metallic powders 4 on the surfaces thereof and an undesired distribution thereof into surfaces, of the framework of the porous sheet 1, defining pores 1c formed inside the porous sheet 1. Therefore, at step #3, vibrations are imparted to the porous sheet 1 by a vibration generator 13 to distribute the fine metallic powders 4 uniformly on the surfaces of the porous sheet 1 and drop extra fine metallic powders 4 from the porous sheet 1. Then, at step #4, the fine metallic powders 4 are penetrated into the porous sheet 1 in the thick direction thereof by an air knife 14 to drop possible clogging of the fine metallic powders 4 in the pores. In this manner, the fine metallic powders 4 can be allowed to adhere uniformly to the organic adhesive agent 2 which has attached to the surfaces, of the framework, defining pores. In this manner, a conductive metallic layer 5 is formed on the surface of the porous sheet 1.

The processes to be performed at step #2 through step #4 are performed one to three times depending on necessity so that the amount of the conductive metallic layer 5 formed on the surface of the porous sheet is approximately ½ of a predetermined total amount of a metallic layer to be formed on the surface of the porous sheet 1. Although the amount of the conductive metallic layer 5 is not limited to ½ of the predetermined total amount of the metallic layer, it is set to ½ in the first embodiment.

If the fine metallic powders 4 consist of a metal, other than Cu or Ag, which is readily oxidized on the surface thereof, the porous sheet 1 on which the conductive metallic layer 5 has been formed is immersed in a bath 15 containing activating solution so as to activate the fine metallic powders 4.

Thereafter, at step #6, if the specific resistance of the fine metallic powders 4 is high, the porous sheet 1 is immersed in a bath 16 containing replacing solution so as to carry out replacing treatment.

After drying process is carried out at step #7, organic adhesive agent 6 is applied to the upper surface of the conductive metallic layer 5 at step #8. Similarly to the application of the organic adhesive agent 2 to the porous sheet 1, the porous sheet 1 is transported to a bath 17 containing the adhesive agent 6 so as to apply the organic adhesive agent 6 to the upper surface of the conductive metallic layer 5.

At step #9, after the organic adhesive agent 6 is applied to the upper surface of the conductive metallic layer 5, the conductive metallic layer 5 is electroplated by an electroplating device 18 to form an electroplated layer 7. The deposition amount of the electroplated layer 7 is set to the difference obtained by subtracting the amount of the conductive metallic layer 5 from the predetermined total amount of the metallic layer to be formed on the surface of the porous sheet 1.

After the conductive metallic layer 5 is electroplated, the porous sheet 1 is heated at a required temperature for a required period of time by a heating device 19 to burn out the base material, not made of metal, composing the porous sheet 1 from the metallic layer thus formed.

Then, at step #11, the metallic layer is heated at a required temperature for a required period of time by a heating device 20 in reducing atmosphere to sinter the metallic layer consisting of the conductive metallic layer 5 and the electroplated layer 7.

At step #12, the porous sheet 1 is passed through a pair of skin pass rolls 21 to adjust the thickness thereof to a predetermined one.

Figure 3:
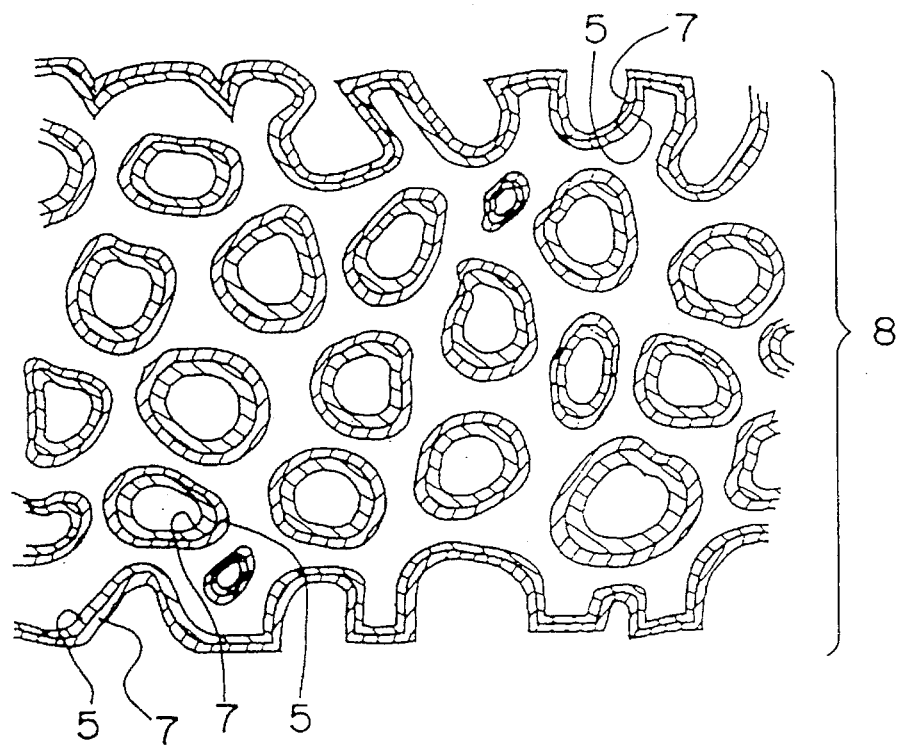
FIG. 3 is a partly enlarged sectional view showing the metallic porous sheet manufactured by the method according to the first embodiment.

In this manner, a metallic porous sheet 8 comprising the framework, surrounding the pores, composed of the conductive metallic layer 5 and the electroplated layer 7 laminated on the conductive metallic layer 5 is manufactured in the processes through steps #1 through #12, as shown in FIG. 3.

In a device, as shown in FIG. 2, for applying the adhesive agent 2 to the porous sheet 1, the adhesive agent 2 such as acrylic adhesive agent is stored in the adhesive agent bath 11; a pick-up roll 22 is so installed in the adhesive agent bath 11 that the pick-up roll 22 contacts the adhesive agent 2; a coating roll 23 is provided in contact with the pick-up roll 22 at an upper portion thereof; and a service roll 24 is provided over the coating roll 23, with the porous sheet 1 sandwiched therebetween.

In the device adopting roll coating method, the adhesive agent 2 in the adhesive agent bath 11 is applied to the porous sheet 1 to impregnate the porous sheet 1 therewith via the pick-up roll 22, the coating roll 23, and the service roll 24, with the porous sheet 1 pressed against the coating roll 23 and the service roll 24.

Figure 4:
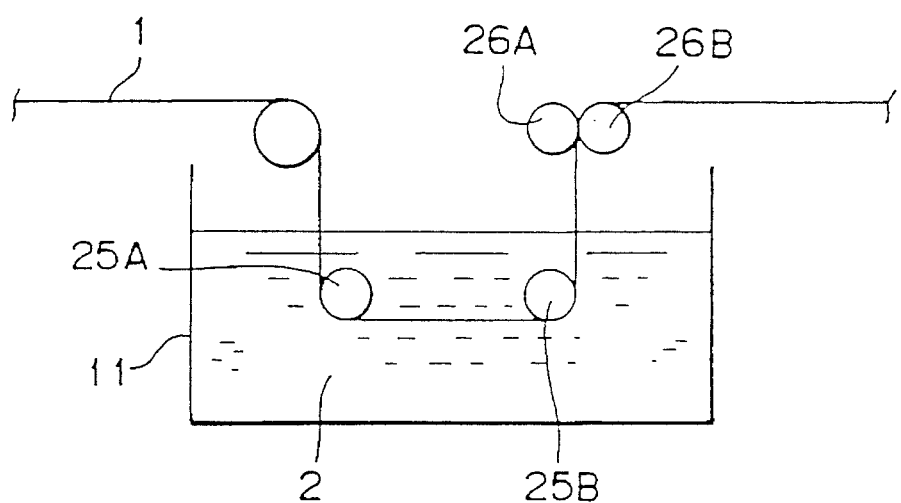
FIG. 4 is a schematic view showing a device, according to the first embodiment, for applying adhesive agent to the metallic porous sheet.

A device adopting the following method as shown in FIG. 4 may be used to apply the adhesive agent 2 to the porous sheet 1 instead of the device shown in FIG. 2. In this device, a plurality of rolls 25A and 25B is so disposed in the adhesive agent bath 11 that they contact the adhesive agent 2; the porous sheet 1 is transported into the adhesive agent bath 11 along the rolls 25A and 25B so as to immerse the porous sheet 1 in the adhesive agent 2; and the porous sheet 1 is passed through the gap between a pair of rolls 26A and 26B disposed, above the adhesive agent bath 11, near the exit thereof so as to remove excessive adhesive agent 2 from the porous sheet 1 by squeezing the porous sheet 1.

According to the methods, shown in FIGS. 2 and 4, of applying the adhesive agent 2 to the porous sheet 1, the porous sheet 1 is passed through the gap between the rolls to press the porous sheet 1 against the rolls. The porous sheet 1 comprising a foamed sheet elastically returns to its original configuration, namely, its initial thickness after it passes through the rolls. Thus, these methods can be used reliably.

When the porous sheet 1 consists of a nonwoven sheet, the porous sheet 1 does not return to its initial thickness after it passes through the rolls. Thus, it is favorable to use a method of spraying the adhesive agent 2 to the porous sheet 1 rather than the above-described methods. In the spray method, the atomized adhesive agent 2 is jetted out from a spray to the porous sheet 1, and excessive adhesive agent 2 is sucked under vacuum to apply the adhesive agent 2 to the porous sheet 1 in a uniform thickness.

When the porous sheet 1 consists of a mesh sheet, above-described two methods can be used reliably.

As shown in FIG. 2, two powder jetting devices 12 are used to apply the fine metallic powders 4 to the porous sheet 1 at step #2 by turning the porous sheet 1 upside down to apply the fine metallic powders 4 to the upper and lower surfaces thereof. As shown in FIG. 2, the powder jetting devices 12 are disposed above the porous sheet 1 being transported horizontally so that the powder jetting devices 12 spray the fine metallic powders 4 downward to the porous sheet 1.

Figure 5:
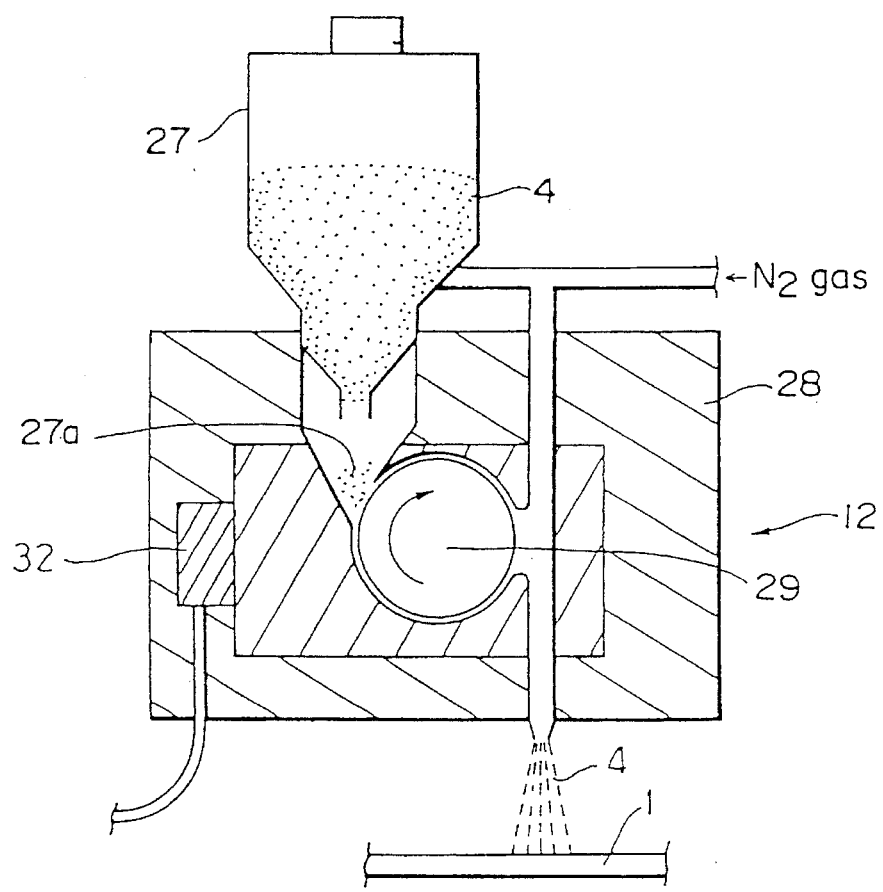
FIG. 5 is a schematic view showing a device, according to the first embodiment, for spraying fine metallic powders on the metallic porous sheet.
Figure 6:
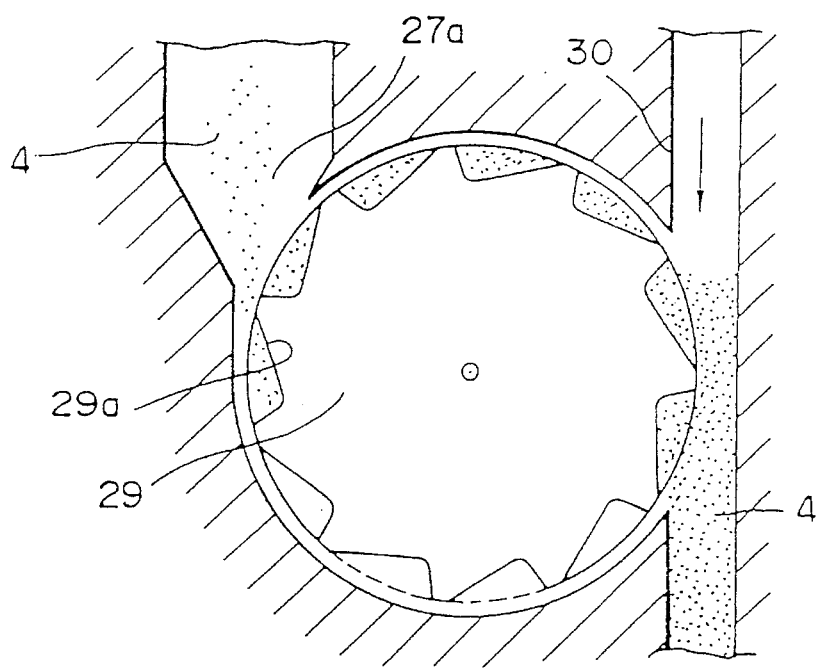
FIG. 6 is a partly enlarged view showing the device shown in FIG. 5.

Referring to FIGS. 5 and 6, the exit 27a, disposed at the lower end of a powder hopper 27 for supplying the fine metallic powders 4 to the powder jetting devices 12, is interposed between a rotor hole 28a of a casing 28 and the peripheral surface of a quantity measuring rotor 29 provided rotatably inside the rotor hole 28a.

As shown in FIG. 6, the quantity measuring rotor 29 has blades 29a inclined on the inner peripheral surface thereof and spaced at regular intervals. While the quantity measuring rotor 29 is rotating, the fine metallic powders 4 which has dropped from the exit 27a to the gap between the blades 29a are taken up and a predetermined amount of the fine metallic powders 4 are held between the adjacent blades 29a.

The casing 28 accommodates a path 30 formed on a side opposed to the location of the exit 27a of the powder hopper 27. The path 30 vertically extends and communicates with the inner peripheral surface of the quantity measuring rotor 29. Nitrogen gas having a high pressure is supplied from the upper end of the path 30 to the quantity measuring rotor 29. The blades 29a of the rotor 29 are turned downward at a position communicating with the path 30, thus dropping the fine metallic powders 4 held in the gap between the adjacent blades 29a. The fine metallic powders 4 are jetted downward by means of nitrogen gas supplied downward through the path 30. The fine metallic powders 4 dropped from the exit of the path 30 is sprayed over the porous sheet 1 traveling below the casing 28. Reference numeral 32 shown in FIG. 5 denotes a vibrator 32.

The fine metallic powders 4 are sprayed not only to the upper surface of the porous sheet 1 by the upper powder jetting device 12 shown in FIGS. 5 and 6, but also to the lower surface thereof by the lower powder jetting device 12 by turning the porous sheet 1 upside down along the transport path, as shown in FIG. 2.

The spray of the fine metallic powders 4 over the porous sheet 1 by means of the powder jetting devices 12 may lead to a nonuniform distribution thereof and in addition, clogging thereof in the pores of the porous sheet 1. Accordingly, after the fine metallic powders 4 are sprayed over the porous sheet 1, vibration is imparted to the porous sheet 1 by the vibration generator 13 disposed below the porous sheet 1 to disperse the fine metallic powders 4 and blow out excessive fine metallic powders 4 which have clogged in the pores. In this manner, the fine metallic powders 4 uniformly adheres to the adhesive agent 2 applied to the upper surface of the porous sheet 1 and the surfaces defining the pores.

The fine metallic powders 4 which have not adhered to the adhesive agent 2 and have been blown by the vibration generator 13 are collected to be recycled.

Therefore, the fine metallic powders 4 are sprayed by the powder jetting devices 12 and blown by the vibration generator 13 in the sealed casing 28.

After vibrations are imparted to the porous sheet 1, high pressure air is blown to the porous sheet 1 by the air knife 14 to penetrate the fine metallic powders 4 disposed on the surfaces of the porous sheet 1 into the porous sheet 1 in the thickness direction thereof, namely, into the pores of the porous sheet 1, thus reliably coating the walls of the pores with the fine metallic powders 4 and blowing out the fine metallic powders 4 which have clogged in the pores.

It is possible to repeatedly perform the process of spraying the fine metallic powders 4 over the porous sheet 1, imparting vibrations to the porous sheet 1, and penetrating the fine metallic powders 4 into the pores of the porous sheet 1 by means of the air knife.

If the porous sheet 1 is thin, the fine metallic powders 4 may be sprayed on only the upper surface of the porous sheet 1 or on the lower surface thereof.

After the conductive metallic layer 5 is formed in the process to be performed at steps #1 through #4, activation treatment and replacement treatment are performed at steps #5 and #6, respectively. These treatments are not necessarily effected if the fine metallic powders 4 consist of Cu or Ag which are conductive. If the fine metallic powders 4 consist of a metal which is easily oxidized on the surface thereof, i.e., if they are unconductive, the activation treatment is carried out at step #5. If the specific resistance of the metal of the fine metallic powders 4 is high, replacement treatment is performed at step #6 to reduce the electric resistance thereof to less than 30 Ω/cm.

It is possible to immerse the fine metallic powders 4 in activating solution and replacing solution sequentially before the fine metallic powders 4 are applied to the porous sheet 1 and then, spray the fine metallic powders 4 subjected to the activation and replacement treatments over the porous sheet 1 by means of the powder jetting device 12.

Preferably, in order to improve the conductivity of the fine metallic powders 4, before or without immersing the fine metallic powders 4 in the activating and replacing solutions, powders of one of metals such as Au, Ag, Cu and In more conductive and having a lower hardness than the metal composing the fine metallic powders 4 and not readily oxidized are put into a ball mill together with the fine metallic powders 4 and mixture is stirred. In this manner, the fine metallic powders 4 are coated under pressure with the fine metallic powders of one of Au, Ag, Cu and In.

Figure 7:
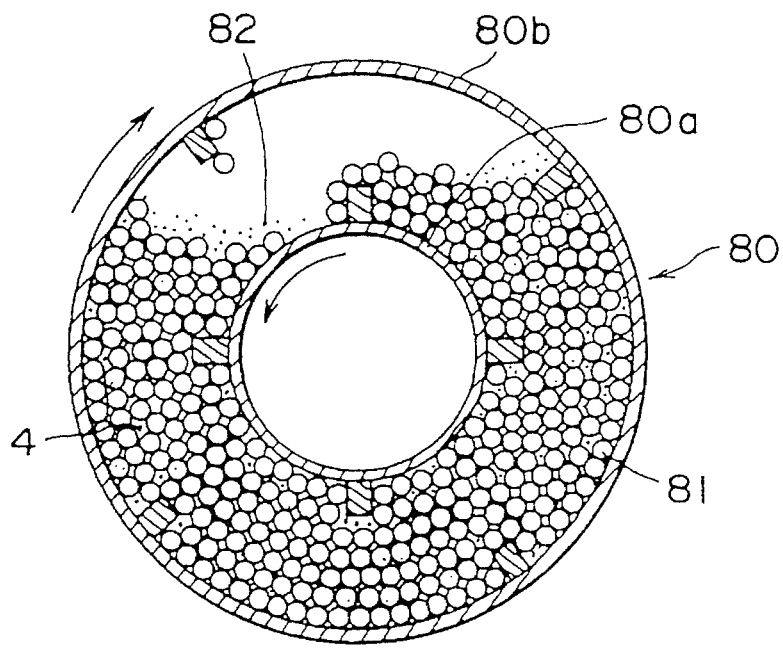
FIG. 7 is a schematic sectional view showing a device for imparting conductivity to fine metallic powders.

More specifically, as shown in FIG. 7, an inner cylinder 80a of a ball mill 80 and an outer cylinder 80b thereof are rotated for a predetermined period of time, with the nickel fine metallic powders 4 and zirconia balls 81 put in the ball mill 80 so as to distribute the nickel fine metallic powders 4 uniformly in the ball mill 80. Then, the inner cylinder 80a and the outer cylinder 80b are rotated again for a predetermined period of time, with Ag powders 82 put into the ball mill 80. As a result, the nickel fine metallic powders 4 are coated with the soft Ag powders 82 under pressure.

EXPERIMENT 1

Acrylic adhesive agent (acrylic resin: 45%; water, alcohol or solvent: 55%) was put into the adhesive agent bath 11. The porous sheet 1 made of a nonwoven sheet was transported by using the method shown in FIG. 4, with the porous sheet 1 immersed in the adhesive agent 2 contained in the adhesives agent bath 11. Excessive adhesive agent 2 was sucked under vacuum in the vicinity of the exit of the adhesive agent bath 11.

Nickel fine powders less than 1.0 µm in size were sprayed on the porous sheet 1 by the powder jetting device 12; vibrations were imparted to the porous sheet 1; nickel fine powders were penetrated into pores of the porous sheet 1 by means of the air knife 14; and then, the porous sheet 1 was heated at 150° C. for one minute. Nickel fine powders were sprayed on the upper and lower surfaces of the porous sheet 1 once, respectively as shown in FIG. 2.

The weight of the fine metallic powders 4 composing the conductive metallic layer 5 formed on the porous sheet 1 in the above process was 130 g/m$^2$.

The porous sheet 1 on which the conductive metallic layer 5 had been formed was immersed in a solution of 2N nitric acid at the room temperature for one minute to activate the fine metallic powders 4.

Figure 8:
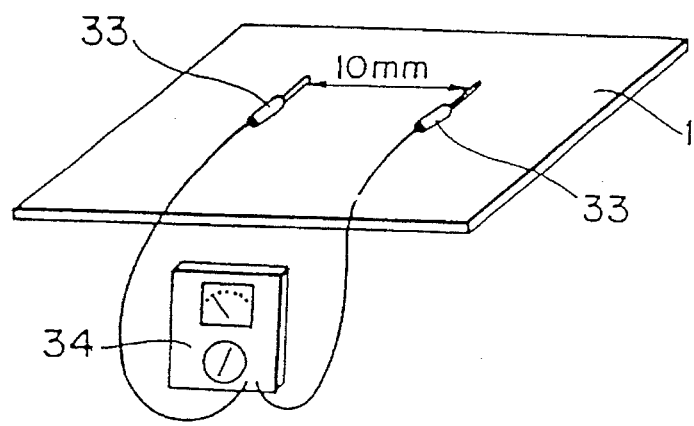
FIG. 8 is a schematic view showing a method of measuring the electric resistance of a conductive metallic layer.

Electric resistance of the conductive metallic layer 5 subjected to the activation treatment was 4,800 Ω/cm. In order to measure the electric resistance, a pair of testers 33 was installed on the surface of the porous sheet 1 on which the conductive metallic layer 5 had been formed, with the testers 33 spaced from each other at 10 mm, and conductors were connected with the tester 33 and a measuring meter, as shown in FIG. 8.

After the activation treatment was carried out, the porous sheet 1 was immersed in an Ag replacing solution having Ph 4–5 at the room temperature for 30 seconds. The Ag replacing solution consisted of 5–10 g/liter of nitrate silver mixed with ammonia serving as reducing agent, aldehyde, sodium hypophosphite and stabilizer.

The electric resistance of the conductive metallic layer 5 was 8.0 Ω/cm which is lower than the upper limit of the electric resistance 30 Ω/cm required in carrying out electroplating.

When the porous sheet 1 was immersed in a chemical nickel (reaction) plating solution instead of the silver replacement solution so as to form the electroplated layer 7 in an amount 22 g/m$^2$ on the conductive metallic layer 5, the electric resistance of the conductive metallic layer 5 was 6.0 Ω/cm.

After the replacing treatment was carried out, organic adhesive agent 6 similar to the organic adhesive agent 2 to be contained in the adhesive agent bath 11 was sprayed over the entire surface of the conductive metallic layer 5 to electroplate the conductive metallic layer 5.

An electroplating bath was prepared by mixing 360 g/liter of nickel sulfate, 60 g/liter of nickel chloride, and 42 g/liter of boric acid, and the temperature of the bath was set to 65° C.

A nickel-plated layer 7 was formed on the surface of the conductive metallic layer 5 in the electroplating. The amount of the nickel-plated layer 7 thus formed was 290 g/m$^2$ in the electroplating. Thus, the total amount of the metallic layer consisting of the conductive metallic layer 5 (130 g/m$^2$) and the electroplated layer 7 was 420 g/m$^2$ (130+290).

Subsequently to the electroplating, the nonwoven sheet was burned out by heating the porous sheet 1 at 800° C. for three minutes. Then, the metallic layer consisting of the conductive metallic layer 5 and the electroplated nickel layer was sintered by heating it in atmosphere of decomposed ammonia gas at 1,000° C. for 10 minutes.

Figure 9A:
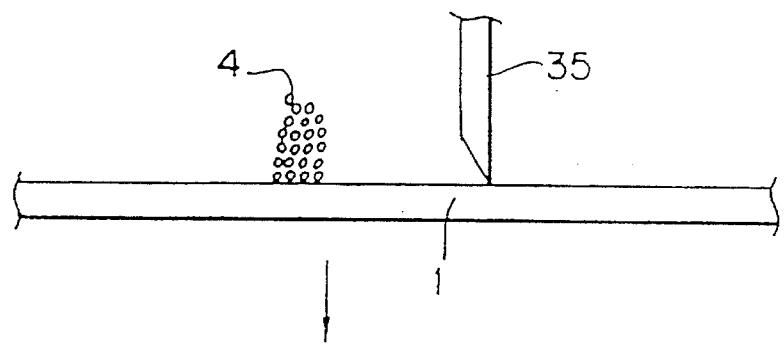
FIG. 9A, 9B and 9C are a schematic view showing a device, according to an embodiment, for spraying fine metallic powders on the metallic porous sheet.
Figure 9B:
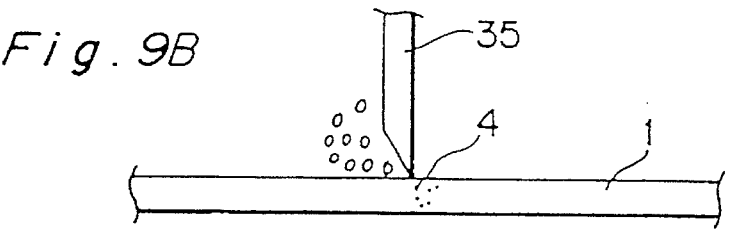
Figure 9C:
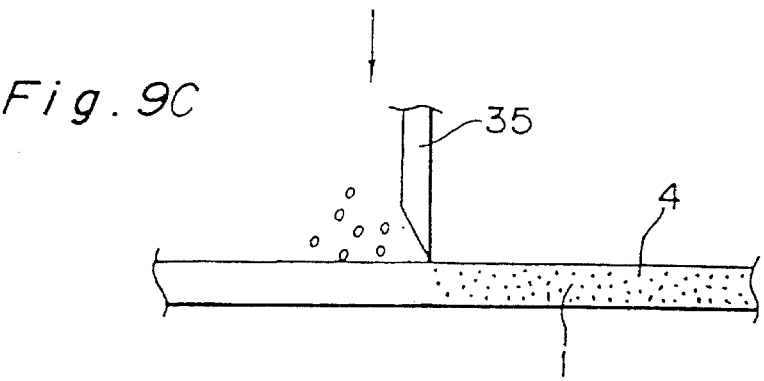

In the first embodiment, the fine metallic powders 4 are sprayed on the porous sheet 1 by the powder jetting device 12 but it is possible to use a doctor knife 35 to entirely spread the fine metallic powders 4 supplied to the surface thereof in order to distribute them thereon in a predetermined thickness, as shown in FIGS. 9A, 9B and 9C.

After the fine metallic powders 4 are distributed. uniformly on the upper surface of the porous sheet 1 by the doctor knife 35, vibration is imparted to the fine metallic powders 4 and then, the fine metallic powders 4 are applied to the surfaces, of the framework, defining the pores of the porous sheet 1 with an air knife, similarly to the first embodiment.

Figure 10:
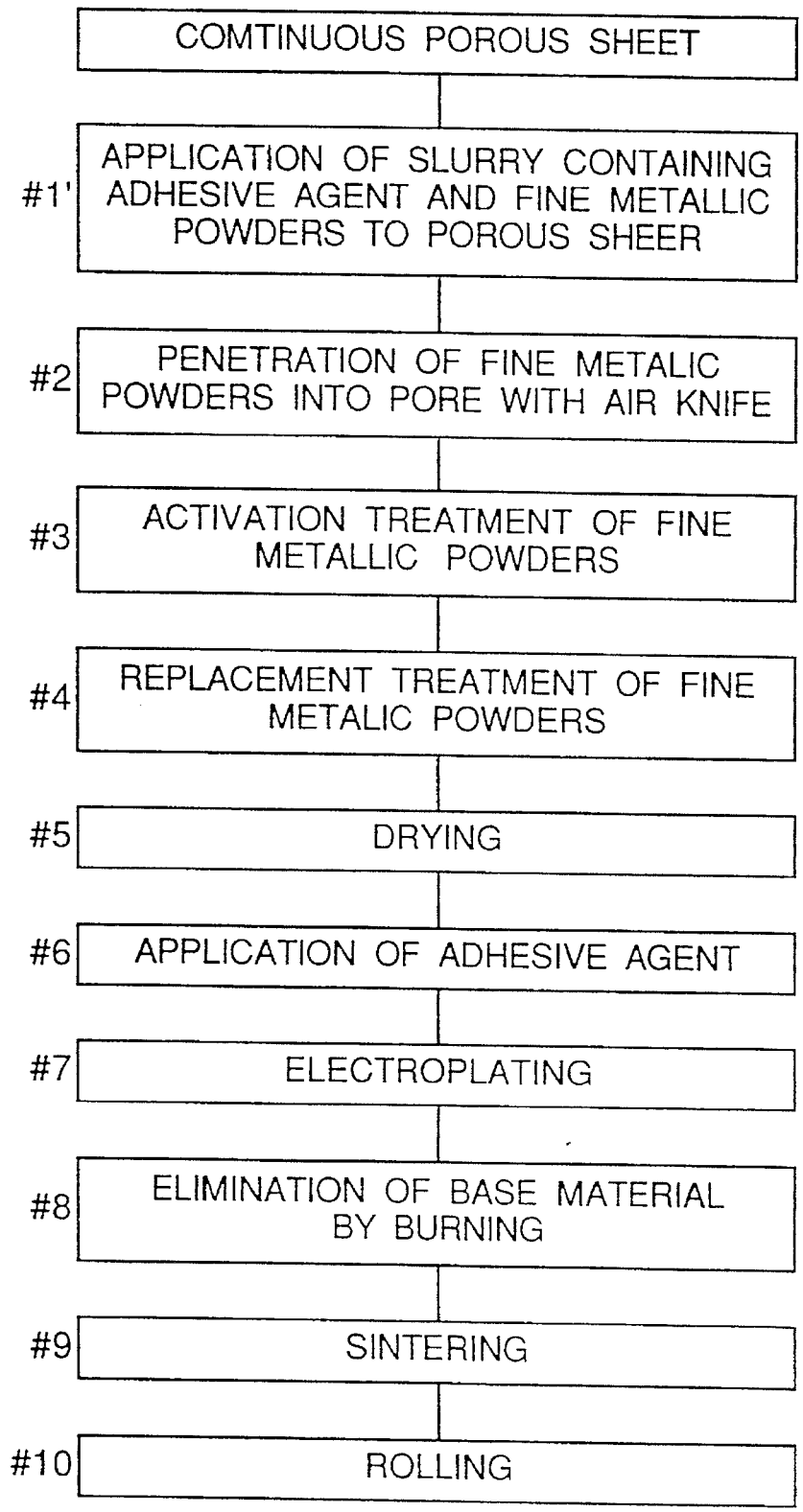
FIG. 10 is a flowchart showing the process of manufacturing a metallic porous sheet according to a second embodiment of the present invention.

A metallic porous sheet according to a second embodiment is described below with reference to FIGS. 10 through 14. FIG. 10 is a flowchart showing the manufacturing process according to the second embodiment of the present invention. Instead of the processes to be performed at steps #1 through #3 of the first embodiment,, slurry containing the adhesive agent 2 and fine metallic powders 4 mixed with each other is applied to the porous sheet 1 at step #1' in the second embodiment. The processes to be performed at step #2 through step #10 of the second embodiment correspond to those to be performed at step #4 through step #12 of the first embodiment.

Figure 11:
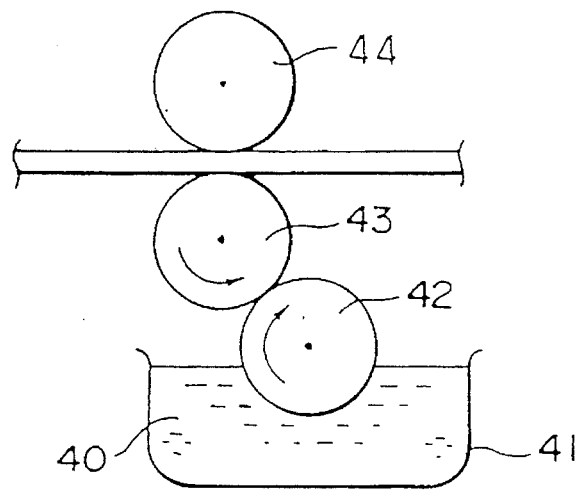
FIG. 11 is a schematic view showing a device, according to the second embodiment, for applying slurry to the metallic porous sheet.

In the second embodiment, at step #1', slurry 40 containing the adhesive agent 2 and the fine metallic powders 4 mixed with each other is applied to the entire surface of the porous sheet 1 and penetrated into the surfaces, of the framework, defining the pores formed in the porous sheet 1 to impregnate the porous sheet 1 with the slurry 40, as shown in FIG. 11.

Roll coating method is preferably used to apply the slurry 40 to the surface of the porous sheet 1, but it is possible to apply it thereto by a spray or rolls immersed in the slurry. In addition, screen coating may be used.

In a device, shown in FIG. 11, adopting roll coating method, a pick-up roll 42 is disposed in a bath storing the slurry 40, with a lower portion of the pick-up roll 42 immersed in the slurry 40. A coating roll 43 is disposed over the pick-up roll 42 in contact therewith. A service roll 44 is disposed over the coating roll 43, with the porous sheet 1 sandwiched between the coating roll 43 and the service roll 44.

In the device, the slurry 40 is transferred to the coating roll 43 via the pick-up roll 42 so that the slurry 40 is applied to the porous sheet 1, with the porous sheet 1 pressed against the coating roll 43 and the service roll 44.

The amount of the slurry 40 to be applied to the porous sheet 1 can be controlled by adjusting the gap between the pick-up roll 43 and the service roll 44. In the second embodiment, the length of the gap between the pick-up roll 43 and the service roll 44 is set to about ⅓ of the thickness of the porous sheet 1 so that the interior of the porous sheet 1 can be impregnated with the slurry 40 reliably.

In the device, the amount of the slurry 40 to be applied to the lower surface of the porous sheet 1 in contact with the coating roll 43 is more than that to be applied to the upper surface thereof in contact with the service roll 44. Thus, it is preferable to turn the porous sheet 1 upside down by using a device similar to that shown in FIG. 11 to apply the slurry 40 to the upper surface of the porous sheet 1 by the coating roll 43. In this manner, the slurry 40 is applied to the upper and lower surfaces of the porous sheet 1 in a uniform thickness.

Figure 12A:
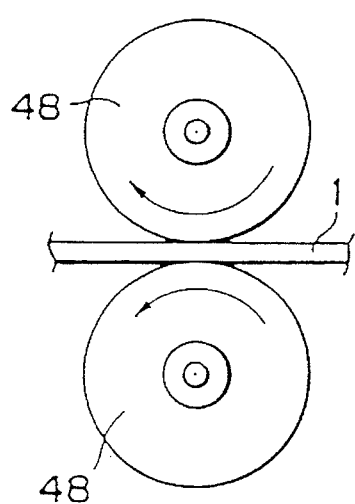
FIG. 12A is a schematic side view showing another device for applying slurry to the metallic porous sheet.
Figure 12B:
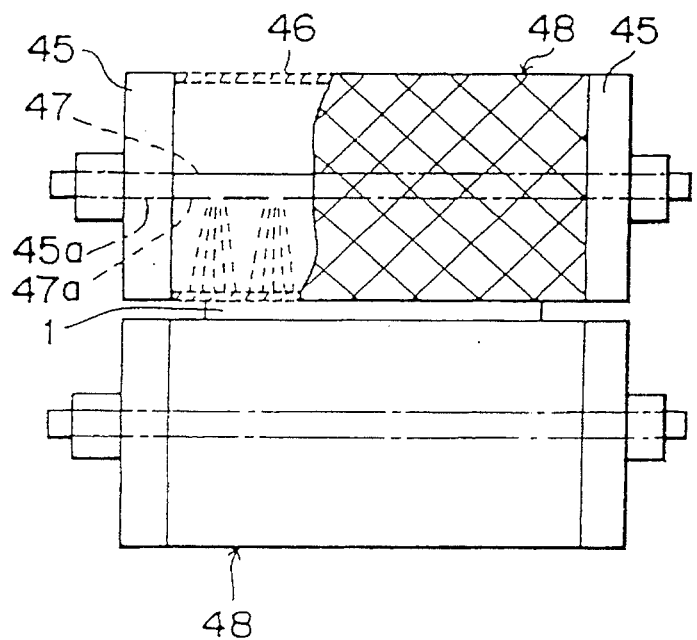
FIG. 12B is a schematic front view showing the device shown in FIG. 12A.

The slurry 40 may also be applied to the porous sheet 1 by a device shown in FIGS. 12A and 12B. That is, by using rotary screen method, the slurry 40 is supplied into rolls to apply the slurry 40 to the porous sheet 1 via a screen constituting the peripheral surface of each roll. The device comprises a pair of coating rolls 48 having the following construction: That is, a cylindrical peripheral wall on which a rotatable screen 46 made of a wire gauze has been installed is provided between side plates 45 disposed at both sides of the device; a hole 45a is formed at the center of each of the side plates 45; a slurry supply pipe 47 is disposed along the axis of the cylindrical screen 46, with both sides of the slurry supply pipe 47 inserted into the holes 45a; slurry jetting openings 47a are formed on the slurry supply pipe 47 at regular intervals; and the coating rolls 48 are so disposed that they sandwich the porous sheet 1.

The slurry 40 is supplied to the slurry supply pipe 47 disposed inside the coating roll 48 and jetted from the slurry jetting holes 47a to the porous sheet 1 via the screen 46 so that the porous sheet 1 is impregnated with the slurry 40.

The slurry 40 jetted toward the porous sheet 1 through the screen 46 is applied thereto in a uniform thickness.

Figure 13A:
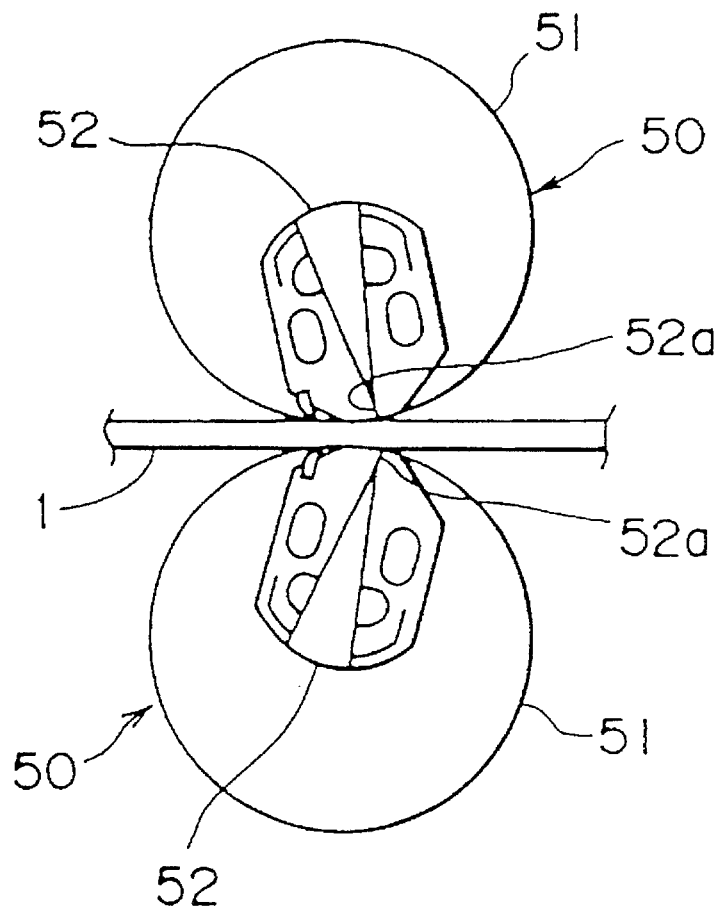
FIG. 13A is a schematic side view showing still another device for applying slurry to the metallic porous sheet.
Figure 13B:
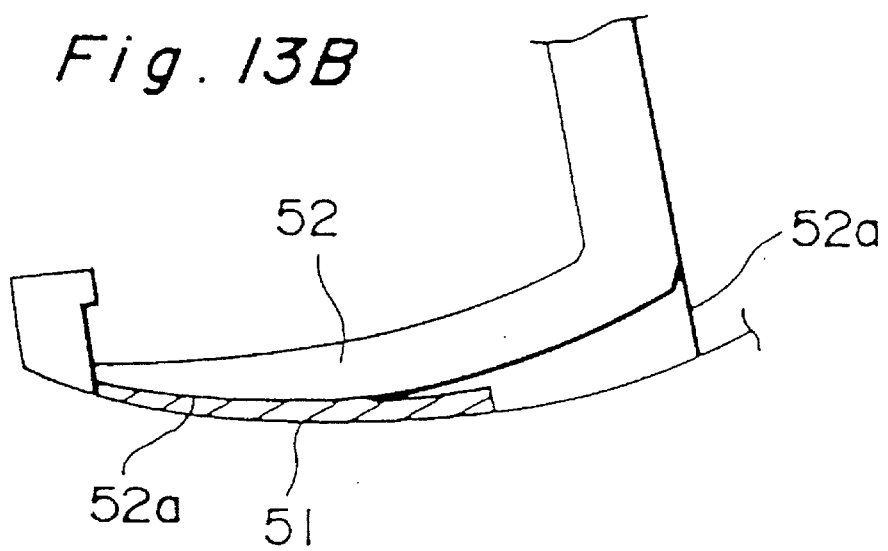
FIG. 13B is a partly enlarged view showing the device shown in FIG. 13A.

Rotary screen method is also adopted in a device shown in FIGS. 13A and 13B. Similarly to the device shown in FIGS. 12A and 12B, a pair of coating rolls 50 sandwiches the porous sheet 1 therebetween. Similarly to the coating rolls 48 shown in FIGS. 12A and 12B, a screen 51 made of a wire gauze is installed on the peripheral surface of each coating roll 50. The slurry 40 foamed by a pipe (not shown) disposed along the axis of the coating roll 50 is supplied to a scavenging member 52 disposed inside each coating roll 50 at a pressure of 2–3 atmospheres.

The scavenging member 52 to which the foamed slurry 40 is supplied has a discharge opening 52a on the side opposed to the porous sheet 1. When the slurry 40 is supplied from the discharge opening 52a to the porous sheet 1 through the screen 51, the slurry 40 contacts atmospheric air. As a result, the foamed slurry 40 bursts due to the difference between the pressure of the atmospheric air and that of the foamed slurry 40 and returning to its original state, namely, pasty, thus being applied to the porous sheet 1 in a uniform thickness.

In the devices shown in FIGS. 11, 12, and 13, the thickness of the porous sheet 1 is set to be larger than the length of the gap between the coating rolls, and the slurry 40 is applied to the porous sheet 1 when the porous sheet 1 is passing through the gap between the coating rolls, with the porous sheet 1 pressed against the rolls. The pressing force of the coating rolls causes the slurry 40 to be penetrated into the porous sheet 1 in the thickness direction thereof.

At this time, the porous sheet 1 consisting of a foamed sheet or a mesh sheet elastically returns to its original thickness after it passes through the rolls. When the porous sheet 1 consists of a nonwoven sheet, the porous sheet 1 does not return to its initial thickness after it passes through the rolls.

Figure 14:
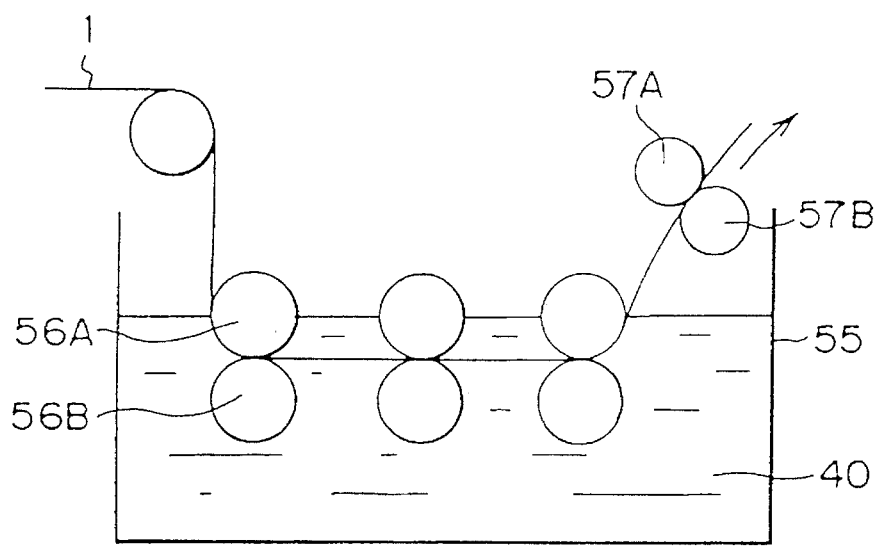
FIG. 14 is a schematic side view showing a device for applying slurry to the metallic porous sheet.

Thus, it is preferable to immerse the nonwoven sheet in the slurry 40 by using an immersing device as shown in FIG. 14. That is, a plurality of upper and lower coating rolls 56A and 56B is arranged in parallel with each other in a bath 55 containing the slurry 40, and a pair of squeezing rolls 57A and 57B is disposed at a position above the bath 55.

The porous sheet 1 is passed through the gaps between the coating rolls 56A and 56B immersed in the slurry 40 to apply the slurry 40 to the porous sheet 1. This method allows the slurry 40 to be penetrated into the porous sheet 1 in the thickness direction thereof reliably. Then, the porous sheet 1 is passed through the gap between the squeezing rolls 57A and 57B so as to be squeezed. In this manner, the slurry 40 which has excessively attached to the porous sheet 1 is returned to the bath 55.

A method of spraying the slurry 40 to the surface of the porous sheet 1 can also be utilized. In addition, it is possible to use the doctor knife to distribute the slurry 40 supplied to the surface of the porous sheet 1 entirely in a uniform thickness and penetrate it thereinto in the thickness direction thereof.

After the slurry 40 is applied to the porous sheet 1 to impregnate the porous sheet 1 therewith at step #1' by the method described above, similarly to the first embodiment, the slurry 40 applied to the porous sheet 1 with the air knife 14 at step #2 is penetrated into the slurry 40 in the thickness direction thereof and then, the slurry 40 which has clogged in pores of the porous sheet 1 is blown out therefrom. In this manner, the slurry 40 is attached to the entire surface of the porous sheet 1 and the surfaces, of the framework, defining the pores in a uniform thickness.

A vibrator may be used instead of the air knife or both the vibrator and the air knife can be used.

Subsequently to step #2, the porous sheet 1 is dried, and then, similarly to the first embodiment, the fine metallic powders 4 are activated at step #3. At step #4, replacing treatment is performed.

The activation and replacement treatments may be performed before the slurry 40 is prepared by mixing the fine metallic powders 4 and organic adhesive agent with each other.

The activation and replacement treatments to be performed in the second embodiment are similar to those to be performed in the first embodiment and thus the descriptions thereof are omitted herein. Further, the treatments to be carried out at steps #5 through #9 are similar to those to be performed in the first embodiment, and thus the descriptions thereof are also omitted herein.

The method of forming the slurry 40 comprising the organic adhesive agent and the fine metallic powders 4 and applying the slurry 40 to the porous sheet 1 has a problem that if the viscosity of the slurry 40 is high, the surface of the porous sheet 1 becomes rough. That is, if the viscosity of the slurry 40 is high, the slurry 40 attaches to the surface of the porous sheet 1 in ball configurations. As a result, the surface of the porous sheet 1 becomes irregular.

If the amount of water contained in the slurry 40 is increased to decrease the viscosity of the slurry 40, it is necessary to dry the slurry 40 for a long time.

Accordingly, it is preferable to set the viscosity of the slurry 40 to a range from 2,000 cps to 15,000 cps.

If the mixing ratio of the adhesive agent 2 to be contained in the slurry 40 is small, the electric resistance of the conductive metallic layer 5 becomes low, whereas if large, the electric resistance thereof becomes high. Thus, it is preferable to contain the adhesive agent 2 in the slurry 40 at a small mixing ratio. Considering a minimum amount necessary of the adhesive agent 2 for attaching the fine metallic powders thereto, preferably, the adhesive agent 2 is contained in the slurry 40 in a range of 3–20 in weight percentage.

The amount of the conductive metallic layer 5 formed by applying the slurry 40 to the porous sheet 1 is 50–95% of the predetermined total amount of the metallic layer and that of the electroplated layer 7 is 5–50% thereof, respectively.

It is preferable to form the conductive metallic layer 5 by applying the slurry 40 to the surface of the porous sheet 1 several times, if the thickness of the conductive metallic layer 5 is desired to be large. This is because the surface of the porous sheet 1 becomes rough, if the slurry 40 is applied to the surface of the porous sheet 1 only one time in forming the thick conductive metallic layer 5. Thus, in the final application of the slurry 40 divided into several parts, it is preferable that the adhesive agent is contained in a possible smallest amount in the slurry 40 to make the electric resistance of the conductive metallic layer 5 low, which enables electroplating to be carried out at a high current.

EXPERIMENT 2

Mixture of 90 parts of epoxy adhesive agent (epoxy adhesive agent: 10%, water: 90%), 600 parts of Ni fine powders, 480 parts of water, and one part of dispersing agent was put into a high speed rotary stirrer to form the slurry 40. The viscosity of the slurry 40 was 4,200 cps.

A 1.6 mm thick foamed sheet made of ester polyurethane sponge was used as the porous sheet 1. The porous sheet 1 was passed through the 0.2 mm thick gap between the coating rolls 48 shown in FIG. 12 so that the coating rolls 48 apply the slurry 40 to the upper and lower surfaces of the porous sheet 1 and impregnate it with the slurry 40.

Then, the slurry 40 was penetrated into the porous sheet 1 in the thickness direction thereof by means of an air knife. Then, the porous sheet 1 was dried at 150° C. for one minute.

The amount of the conductive metallic layer 5 which attached to the porous sheet 1 was 85 g/m$^2$. The weight 85 g/m$^2$ included the weight of the adhesive agent 2. The weight of the whole fine metallic powders 4 was 76.5 g/m$^2$. The weight of the fine metallic powders 4 was measured after the conductive metallic layer 5 was burned out to eliminate the organic adhesive agent.

The electric resistance of the conductive metallic layer 5 measured after the slurry 40 applied to the porous sheet 1 was dried was as high as 970,000 Ω/cm.

The electric resistance of the activated conductive metallic layer 5 was reduced from 970,000 Ω/cm to 850 Ω/cm. Then, the fine metallic powders 4 were activated to improve the conductivity of the fine metallic powders 4 by performing chemical reaction treatment with silver powders, with the result that the electric resistance of the conductive metallic layer 5 was reduced to 7.5 Ω/cm.

EXPERIMENT 3

Mixture of 140 parts of acrylic adhesive agent, 400 parts of nickel fine metallic powders 4, 680 parts of water, two parts of dispersing agent and 40 parts of 5% MC solution was put into a high speed rotary stirrer to form the slurry 40. The viscosity of the slurry 40 was 6,200 cps.

A 1.7 mm thick foamed sheet made of polyurethane sponge was used as a porous sheet. The porous sheet 1 was passed through the 0.2 mm gap between the coating rolls 50 shown in FIG. 13 so that the coating rolls 50 apply the slurry 40 to the upper and lower surfaces of the porous sheet 1 and impregnate the porous sheet 1 with the slurry 40.

Then, the slurry 40 was penetrated into the porous sheet 1 in the thickness direction thereof by means of the air knife. Then, the porous sheet 1 was dried at 150° C. for one minute.

The amount of the conductive metallic layer 5 which attached to the porous sheet 1 was 125 g/m$^2$, whereas the weight of the fine metallic powders 4 was 112.5 g/m$^2$.

As a result of a second application of the slurry 40 to the porous sheet 1, the amount of the conductive metallic layer 5 which attached to the porous sheet 1 was 250 g/m$^2$. As a result of a third application of the slurry to the porous sheet 1, the amount of the conductive metallic layer 5 which attached to the porous sheet 1 was 375 g/m$^2$.

The fine metallic powders 4 were activated for 30 seconds with 2N nitric acid after the porous sheet 1 was dried and then, replacement treatment thereof was performed with silver, with the result that the electric resistance of the conductive metallic layer 5 was reduced to 7 Ω/cm.

Then, the conductive metallic layer 5 was electroplated at 50 A/dm$^2$ for 35 seconds to form a layer of nickel fine powders in an amount 45 g/m$^2$ on the conductive metallic layer 5.

The porous sheet 1 was heated at 800° C. for three minutes to burn out the foamed sheet and the adhesive agent, and then, the metallic layer consisting of the conductive metallic layer 5 and the electroplated layer was sintered in reducing atmosphere at 1,000° C. for 30 minutes. Then, the porous sheet 1 is passed through the 1.5 mm gap between a pair of skin pass rolls. As a result, a 1.55 mm thick metallic porous sheet 8 was obtained.

The metallic porous sheet 8 was 200 mm in its width before sintering was performed, whereas the width of the metallic porous sheet 8 was reduced to 194 mm after sintering was performed. The thickness of the metallic porous sheet 8 also became smaller.

The reason for the reduction of the thickness is because in the sintering, the adhesive agent contained in the slurry 40 was burnt and in addition, the metallic structure of nickel was formed. Accordingly, the pores (cell) of the metallic porous sheet 8 also contracted.

The small pores cause a problem that a large amount of activating substance cannot be charged thereinto when the metallic porous sheet 8 is used as a battery plate.

Accordingly, it has been found that the above problem is not caused when pores have diameters about 10% larger than the diameters of those formed by the conventional method, supposing that the diameters of those formed by the conventional method are 200–500 μφ.

EXPERIMENT 4

Mixture of 37 parts of acrylic adhesive agent, 500 parts of nickel powders, 550 parts of water, one part of dispersing agent, and 25 parts of 5% MC solution was put into a high-speed rotary stirrer to form the slurry 40. The viscosity of the slurry 40 was 3800 cps.

A 2.5 mm thick nonwoven sheet made of polyester sponge was used as the porous sheet 1. Three pairs of coating rolls 56A and 56B each having an outer diameter of 80 φmm were immersed in the slurry 40 contained in the bath of the immersing device shown in FIG. 14. The gap between the coating rolls 56A and 56B was set to 2.3 mm. The gap between a pair of squeezing rolls 57A and 57B disposed above the bath was set to 2.0 mm.

The nonwoven sheet was passed through the gaps between the three pairs of the coating rolls 56A and 56B and the gap between the squeezing rolls 57A and 57B. Then, the slurry 40 was penetrated into the porous sheet 1 in the thickness direction thereof with the air knife and then, the porous sheet 1 was heated at 150° C. for one minute. As a result, a 2 mm thick sheet was obtained.

The amount of the conductive metallic layer 5 which attached to the porous sheet 1 was 54 g/m$^2$, whereas the weight of the fine metallic powders 4 was 48.6 g/m$^2$.

The electric resistance of the conductive metallic layer 5 was 900,000 Ω/cm.

The conductive metallic layer 5 was activated, with the result that the electric resistance thereof was reduced to 820 Ω/cm.

Then, the conductive metallic layer 5 was activated by performing chemical reaction by using silver powders, with the result that the electric resistance of the conductive metallic layer 5 was reduced to 8.6 Ω/cm.

Electroplating process, process of eliminating the nonwoven sheet and the adhesive agent by burning, and sintering process were performed in a manner similar to those performed in Experiment 1.

Because the nonwoven sheet was made of short fibers, fiber distribution was nonuniform. That is, fibers are concentrated in one area or gaps are formed in the other area. Thus, the nonwoven sheet could not be impregnated with the slurry 40 uniformly.

Accordingly, the mixing ratio of the fine metallic powders in the nonwoven sheet was reduced by about 20% compared with the mixing ratio thereof in the foamed sheet so as to reduce the viscosity of the slurry 40 to 3,000–4,000 cps, namely, so as to make the slurry 40 soft. Consequently, the nonwoven sheet was impregnated with the slurry 40 readily.

EXPERIMENT 5

Mixture of 75 parts of acrylic adhesive agent, 500 parts of Ni fine powders, 360 parts of water, one part of dispersing agent, and 25 parts of 5% MC solution was put into a high speed rotary stirrer to form the slurry 40. The viscosity of the slurry 40 was 9,000 cps.

A 90-mesh sheet made of polyester resin was used as the porous sheet 1, and the immersing device shown in FIG. 14 was used.

Similarly to Experiment 4, the slurry 40 was applied to the mesh sheet. Then, the slurry 40 was penetrated into the mesh sheet in the thickness direction thereof with the air knife. The mesh sheet was then heated at 150° C. for one minute.

The amount of the conductive metallic layer 5 which attached to the porous sheet 1 was 32 g/m$^2$, whereas the weight of the fine metallic powders 4 was 18 g/m$^2$.

The electric resistance of the conductive metallic layer 5 was 97,000 Ω/cm.

The conductive metallic layer 5 was activated, with the result that the electric resistance thereof was reduced to 520 Ω/cm.

Then, the conductive metallic layer 5 was activated by performing chemical reaction with silver powders, with the result that the electric resistance of the conductive metallic layer 5 was reduced to 6.2 Ω/cm.

In blowing the slurry 40 away from the mesh sheet used as the porous sheet with the air knife, it is preferable to set viscosity to as high as 7,000–9,000 cps so that the slurry 40 is not all blown away from the mesh sheet.

Figure 15:
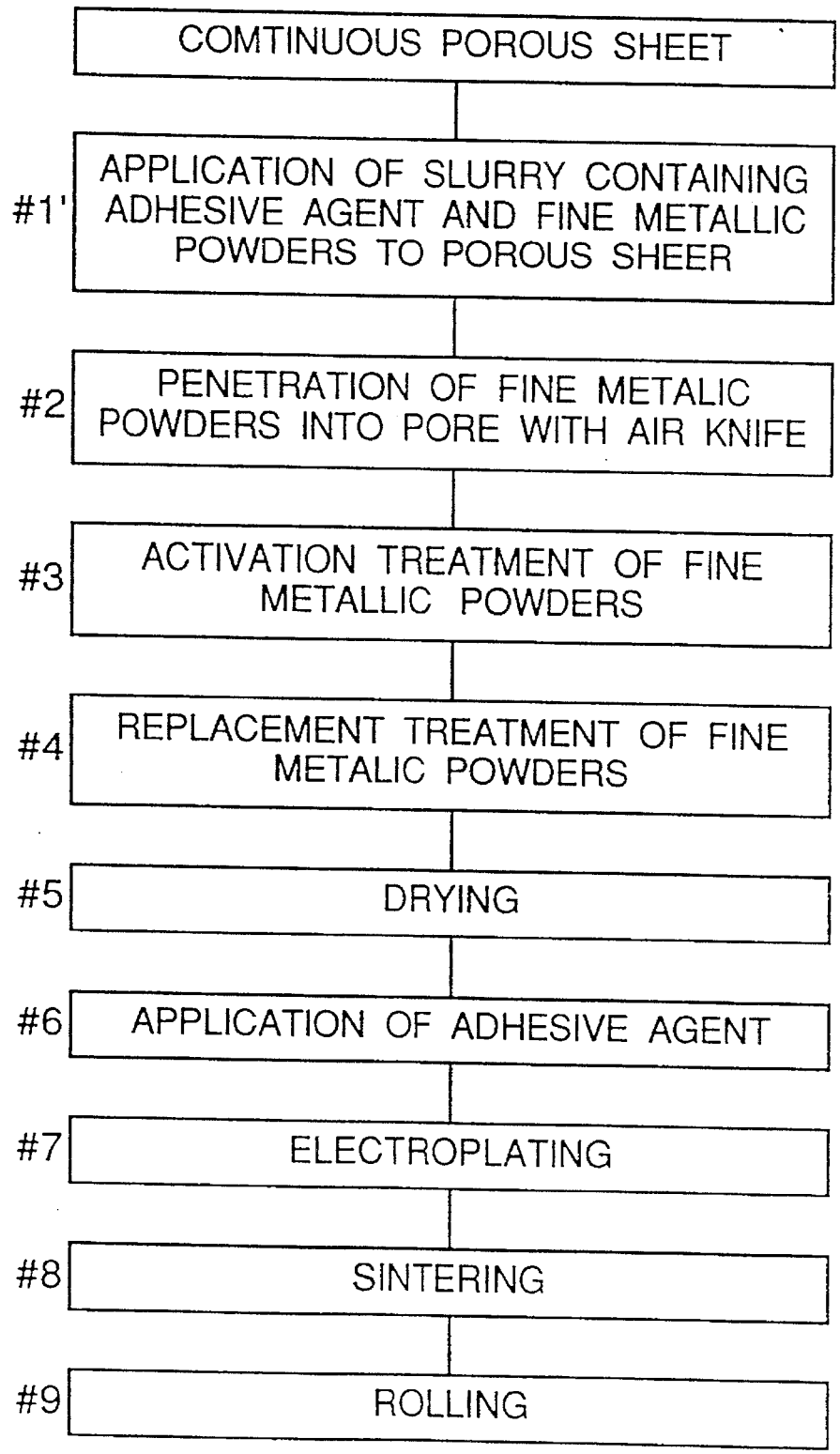
FIG. 15 is a flowchart showing the process of manufacturing a metallic porous sheet according to a third embodiment of the present invention.

A metallic porous sheet according to a third embodiment is described below with reference to FIG. 15. The third embodiment is different from the second embodiment in that the process of burning out the base material to be performed at step #8 in the second embodiment is not done. That is, a foamed sheet consisting of polyurethane sponge or the like, a nonwoven sheet, a mesh sheet used as the base material of the metallic porous sheet is not burned out from the framework comprising the conductive metallic layer 5 and the electroplated layer 7. The process of burning out the base material to be performed at step #10 in the first embodiment is not done either in the third embodiment.

If the mesh sheet is composed of braided metal wires, it is unnecessary to burn out the mesh sheet from the framework the metallic porous sheet.

In the above-described embodiments, the porous sheets to be used as the base material of the metallic porous sheet consist of one foamed sheet, the nonwoven sheet or the mesh sheet. In addition, it is possible to laminate them one on the other to use a laminated sheet as the base material. For example, the foamed sheet and the mesh sheet are layered one on the other or the nonwoven sheet is sandwiched between the mesh sheets. In the process of processing the laminated sheet into the metallic porous sheet, the porous sheets composing the laminated sheet are fixed to each other before they are transported to apply adhesive agent thereto or they are transported by layering them one on the other and fixed to each other immediately before the adhesive agent is applied thereto.

Figure 16:
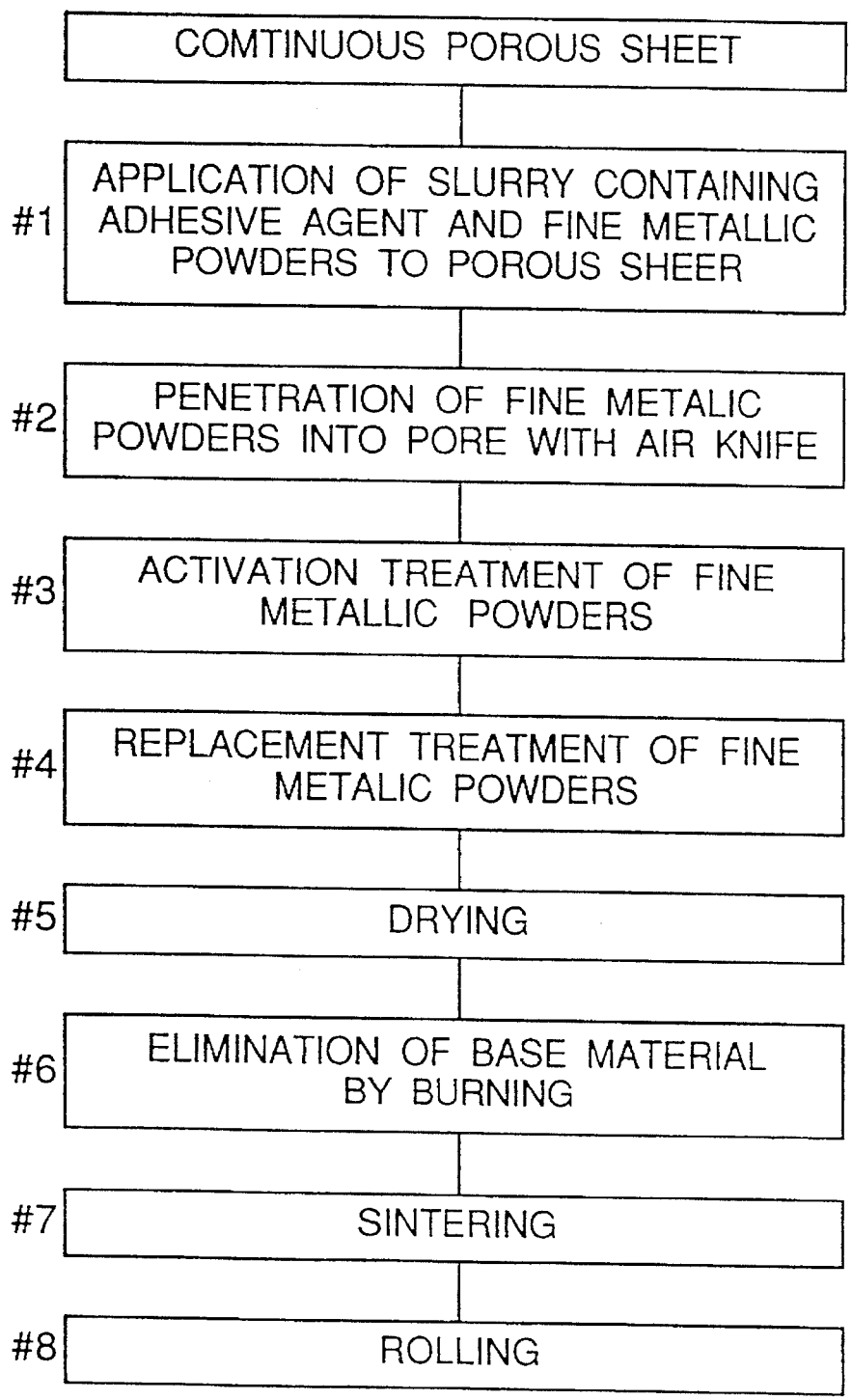
FIG. 16 is a flowchart showing the process of manufacturing a metallic porous sheet according to a fourth embodiment of the present invention.
Figure 17:
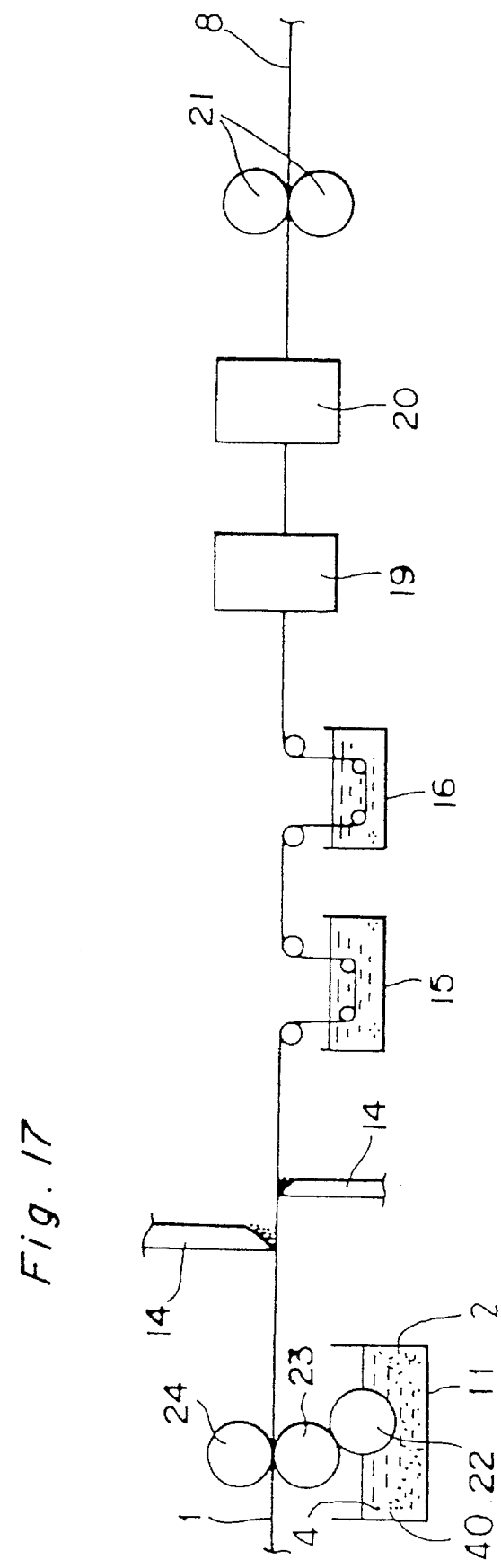
FIG. 17 is a schematic view showing the process of manufacturing a metallic porous sheet according to the fourth embodiment and devices to be used in the fourth embodiment.

A metallic porous sheet according to a fourth embodiment is described below with reference to FIGS. 16 and 17. FIG. 16 is a flowchart showing the manufacturing process according to the fourth embodiment. FIG. 17 is a schematic view showing the manufacturing process and devices to be used in the fourth embodiment.

In the fourth embodiment, electroplating is not performed. That is, the metallic porous sheet is composed of only the conductive metallic layer 5 comprising the fine metallic powders 4.

Similarly to the first through third embodiments, the base material of the metallic porous sheet consists of a three-dimensional net-shaped porous sheet 1 made of a foamed sheet, a nonwoven sheet, a mesh sheet or a plurality of sheets layered one on the other by combining at least two of the above sheets with each other. The porous sheet 1 is continuous and thus transported to be treated in a continuous process.

During the transport of the porous sheet 1, initially, at step #1 of FIG. 16, in the adhesive agent bath 11 storing the slurry 40 containing the organic adhesive agent 2 and the fine metallic powders 4, the slurry 40 is applied to the upper and lower surfaces of the porous sheet 1 and penetrated into the surfaces, of the framework, defining pores, as will be described in detail later.

According to slurry applying method to be carried out at step #1, the porous sheet 1 can be impregnated with the slurry 40 by various methods to be carried out in the first embodiment.

After the slurry 40 is applied to the porous sheet 1, the slurry 40 present on the porous sheet 1 is applied to surfaces, of the framework, defining the pores of the porous sheet 1 with the air knife 14; the slurry 40 which has clogged in the pores is blown away therefrom so as to attach the slurry 40 in a uniform thickness to the surface of the porous sheet 1 and the surfaces, of the framework, defining the pores.

The vibrator may be used instead of the air knife or both the air knife and the vibrator may be used.

After the process to be performed at step #2 is completed, the slurry 40 is dried. Then, at step #3, the fine metallic powders 4 are activated, and replacing treatment is then effected at step #4.

The activating treatment of the fine metallic powders 4 and the replacing treatment thereof may be performed before the slurry 40 is formed by mixing the organic adhesive agent 2 and the fine metallic powders 4 with each other.

That is, if the fine metallic powders 4 consist of a metal, other than Cu or Ag, which is readily oxidized on the surface thereof, the porous sheet 1 on which the conductive metallic layer 5 has been formed is immersed in the bath 15 containing activating solution so as to activate the fine metallic powders 4.

Thereafter, at step #4, if the specific resistance of the fine metallic powders 4 is high, the porous sheet 1 is immersed in the bath 16 containing replacing solution so as to carry out replacing treatment.

After the slurry 40 is dried at step #5, the porous sheet 1 is heated at a required temperature for a predetermined period of time by the heating device 19 at step #6 to burn out the base material, not made of metal, composing the porous sheet 1 from the framework consisting of the conductive metallic layer 5.

Then, at step #7, the porous sheet 1 is heated at a required temperature for a required period of time by the heating device 20 in reducing atmosphere to sinter the fine metallic powders 4.

At step #8, the porous sheet 1 is passed through a pair of the skin pass rolls 21 to adjust the thickness thereof to a predetermined one.

Figure 18:
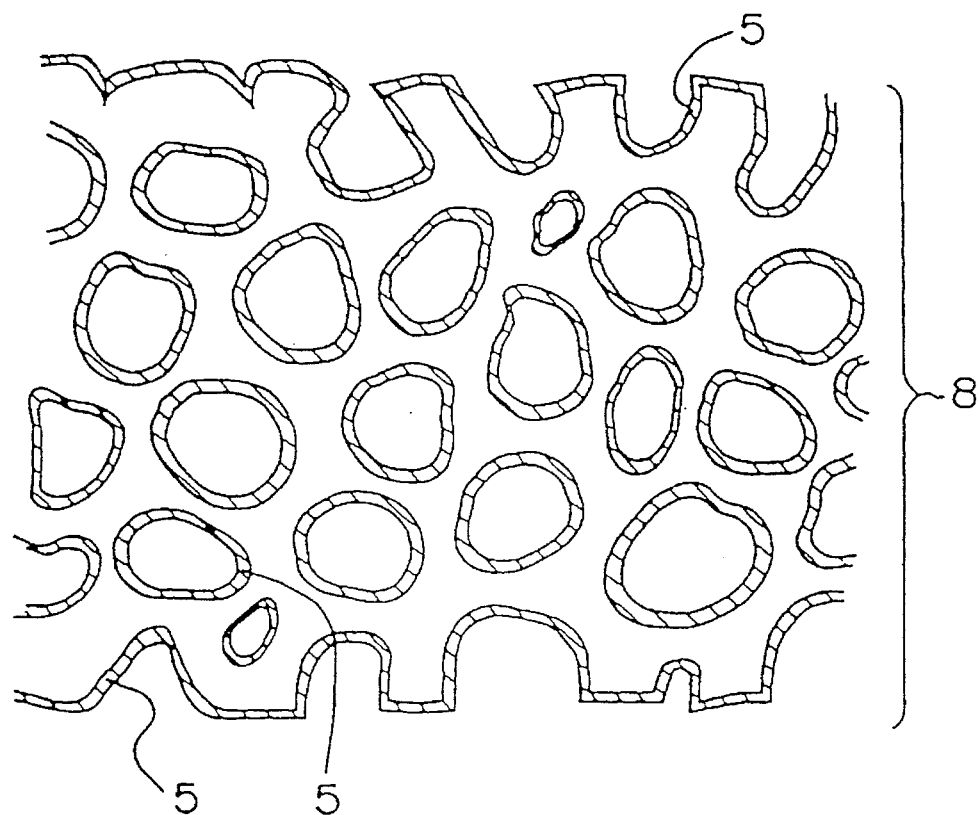
FIG. 18 is a partly enlarged sectional view showing the metallic porous sheet manufactured by the method according to the fourth embodiment.

A metallic porous sheet 8 comprising the three-dimensional net-shaped framework, surrounding the pores, composed of the conductive metallic layer 5 is manufactured in the processes through steps #1 through #8, as shown in FIG. 18.

EXPERIMENT 6

Mixture of 140 parts of acrylic adhesive agent (acrylic adhesive agent: 30%, water: 70%), 400 parts of nickel fine powders 4, 680 parts of water, two parts of dispersing agent, and 40 parts of 5% MC solution was put into a high speed rotary stirrer to form the slurry 40. The viscosity of the slurry 40 was 6,200 cps.

A 1.7 mm thick foamed sheet made of ester polyurethane sponge was used as the porous sheet. The porous sheet 1 was passed through the 0.5 mm gap between the coating rolls 23 and 24 shown in FIG. 17 so that the coating rolls 23 and 24 apply the slurry 40 to the lower side of the porous sheet 1. The slurry 40 applied to the lower side of the porous sheet 1 penetrated upward thereinto and thus the upper side thereof was impregnated with the slurry 40 sufficiently, because the gap between the coating rolls 23 and 24 was set to be small to press the porous sheet 1 against the coating rolls 23 and 24.

Then, the slurry 40 was penetrated into the porous sheet 1 in the thickness direction thereof by means of the air knife. Then, the porous sheet 1 was dried at 150° C. for one minute.

The amount of the conductive metallic layer 5 which attached to the porous sheet 1 was 125 g/m$^2$, whereas the weight of the fine metallic powders 4 was 112.5 g/m$^2$ because the weight 125 g/m$^2$ included the weight of the organic adhesive agent 2. The weight of the fine metallic powders 4 was measured after the conductive metallic layer 5 was sintered.

In a second application of the slurry 40, the porous sheet 1 was turned upside down to apply the slurry 40 to the upper side of the porous sheet 1 immersed in the bath 11.

As a result of the second application of the slurry 40 to the porous sheet 1, the amount of the conductive metallic layer 5 which attached to the porous sheet 1 was 266 g/m$^2$.

As a result of a third application of the slurry 40 to the porous sheet 1, the amount of the conductive metallic layer 5 which attached to the porous sheet 1 was 480 g/m$^2$. The weight of the fine metallic powders 4 was 432 g/m$^2$ which exceeded the predetermined total amount 420 g/m$^2$ of the metallic layer without electroplating the fine metallic powders 4.

The porous sheet 1 was heated at 800° C. for three minutes to burn out the foamed sheet.

Then, the conductive metallic layer 5 was sintered in reducing atmosphere at 1,000° C. for 30 minutes.

Then, the porous sheet 1 is passed through the 1.5 mm gap between a pair of skin pass rolls. As a result, a 1.55 mm thick metallic porous sheet 8 was obtained.

The metallic porous sheet 8 was 200 mm in its width before sintering was performed, whereas the width of the metallic porous sheet 8 was reduced to 180 mm and the thickness thereof also became smaller as a result of sintering. Accordingly, the pores (cell) of the metallic porous sheet 8 also contracted.

The small pores cause a problem that a large amount of activating substance cannot be charged thereinto when the metallic porous sheet 8 is used as a battery plate.

Accordingly, it has been found that the above problem is not caused when pores have diameters about 10% larger than the diameters of those formed by the conventional method, supposing that the diameters of those formed by the conventional method are 200–500 μφ.

EXPERIMENT 7

Mixture of 110 parts of acrylic adhesive agent (acrylic adhesive agent: 30%, water: 70%), 800 parts of fine nickel powders, 680 parts of water, one part of dispersing agent was put into a high-speed rotary stirrer to form the slurry 40. The viscosity of the slurry 40 was 3,600 cps.

A 2.2 mm thick nonwoven sheet made of polyester sponge was used as the porous sheet 1. Two pairs of coating rolls 56A and 56B each having an outer diameter of 80 φmm were immersed in the slurry 40 contained in the bath of the immersing device shown in FIG. 14. The gap between the coating rolls 56A and 56B was set to 2.0 mm. The gap between a pair of squeezing rolls 57A and 57B disposed above the bath was set to 1.9 mm.

The nonwoven sheet was passed through the gaps between the two pairs of the coating rolls 56A and 56B and the gap between the squeezing rolls 57A and 57B. Then, the slurry 40 was penetrated into the porous sheet 1 in the thickness direction thereof with the air knife and then, the porous sheet 1 was heated at 200° C. for 1.2 minutes.

The above process was repeated three times, with the result that the amount of the conductive metallic layer 5 which attached to the porous sheet 1 was 426 g/m² in total.

In the second time execution of the above process, the gap between the coating rolls 56A and 56B was set to 1.9 mm, and the gap between a pair of squeezing rolls 57A and 57B was set to 1.8 mm. In the third time execution of the above process, the gap between the coating rolls 56A and 56B was set to 1.8 mm, and the gap between a pair of squeezing rolls 57A and 57B was set to 1.7 mm. Then, the porous sheet 1 was heated at 800° C. for three minutes to burn out the nonwoven sheet, and the fine nickel powders 4 were then sintered in reducing atmosphere at 1,000° C. for 30 minutes. Thereafter, the porous sheet 1 was passed through the gap between the skin pass rolls to adjust the thickness of the porous sheet 1 to 1.4 mm.

The contraction percentage of the width of the metallic porous sheet 8 manufactured by using the nonwoven sheet was 7% which was smaller than that of the metallic porous sheet 8 manufactured by using the foamed sheet.

The metallic porous sheet 8 withstood tensile force of 2.1 kg/20 mm applied thereto while it was transported.

The metallic porous sheet 8 was curved 360°. The result was that the surface thereof was not cracked, which means that it can be reliably used as an electrode plate of a battery.

Because the nonwoven sheet was made of short fibers, fiber distribution was nonuniform. That is, fibers are concentrated in one area or gaps are formed in the other area. Thus, the nonwoven sheet could not be impregnated with the slurry 40 uniformly.

Accordingly, the mixing ratio of the fine metallic powders with respect to the adhesive agent in the nonwoven sheet was set to be lower by about 20% than the mixing ratio thereof with respect to the adhesive agent in the foamed sheet so as to reduce the viscosity of the slurry 40 to 3,000–4,000 cps, namely, so as to make the slurry 40 soft. Consequently, the nonwoven sheet was impregnated with the slurry 40 readily.

EXPERIMENT 8

Mixture of 200 parts of acrylic adhesive agent (acrylic adhesive agent: 30%, water: 70%), 1,000 parts of fine Ni powders, 680 parts of water, three parts of dispersing agent, and 40 parts of 5% MC solution was put into a high speed rotary stirrer to form the slurry 40. The viscosity of the slurry 40 was 9,000 cps.

A 90-mesh sheet made of polyester resin was used as the porous sheet 1, and the immersing device shown in FIG. 14 was used.

Similarly to the manner used in Experiment 3, the slurry 40 was applied to the mesh sheet. Then, the slurry 40 was penetrated into the mesh sheet in the thickness direction thereof with the air knife. The mesh sheet was then heated at 150° C. for one minute. The amount of the conductive metallic layer 5 which attached to the porous sheet 1 was 253 g/m².

Then, the porous sheet 1 was heated at 800° C. for one minute to burn out the mesh sheet and the slurry 40, and then, the fine nickel powders were then sintered in reducing atmosphere at 900° C. for 30 minutes.

The metallic porous sheet 8 manufactured by using the mesh sheet withstood tensile force of 4.8 kg/20 mm applied thereto while it was transported, and the surface thereof was not cracked when it was curved 360°.

Figure 19:
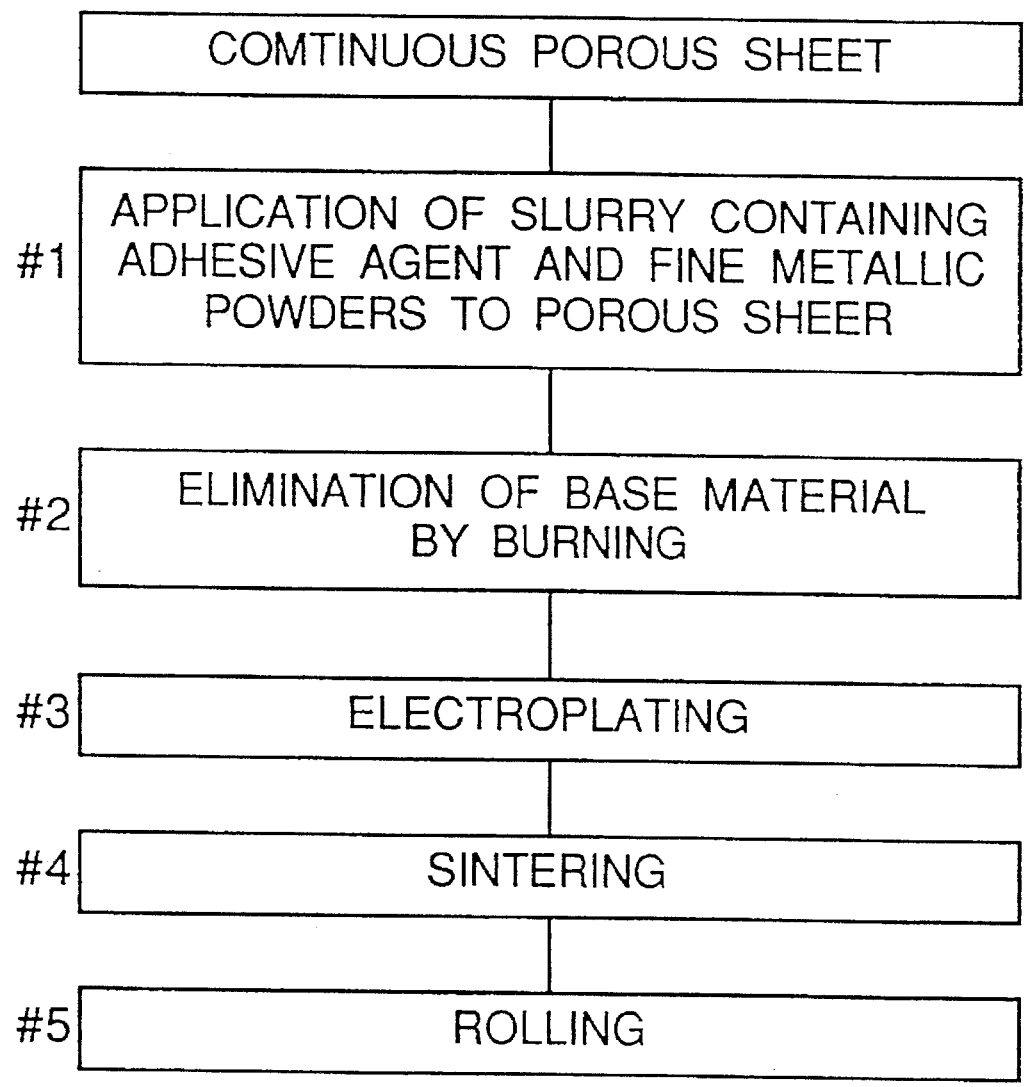
FIG. 19 is a flowchart showing the process of manufacturing a metallic porous sheet according to a fifth embodiment of the present invention.

A metallic porous sheet according to a fifth embodiment is described below with reference to FIG. 19 which is a flowchart showing the manufacturing process 10 according to the fifth embodiment. At step #1, the slurry 40 containing fine metallic powders are applied to the porous sheet 1. At step #2, the porous sheet 1 is heated to burn out the base material and adhesive agent. The fine metallic layer is electroplated at step #3; sintered at step #4; and the sintered fine layer is rolled at step #5.

Needless to say, the processes to be performed at steps #2 through #5 of the fourth embodiment may be carried out as necessary between the steps #1 and #2 to be carried out in the fifth embodiment.

Figure 20:
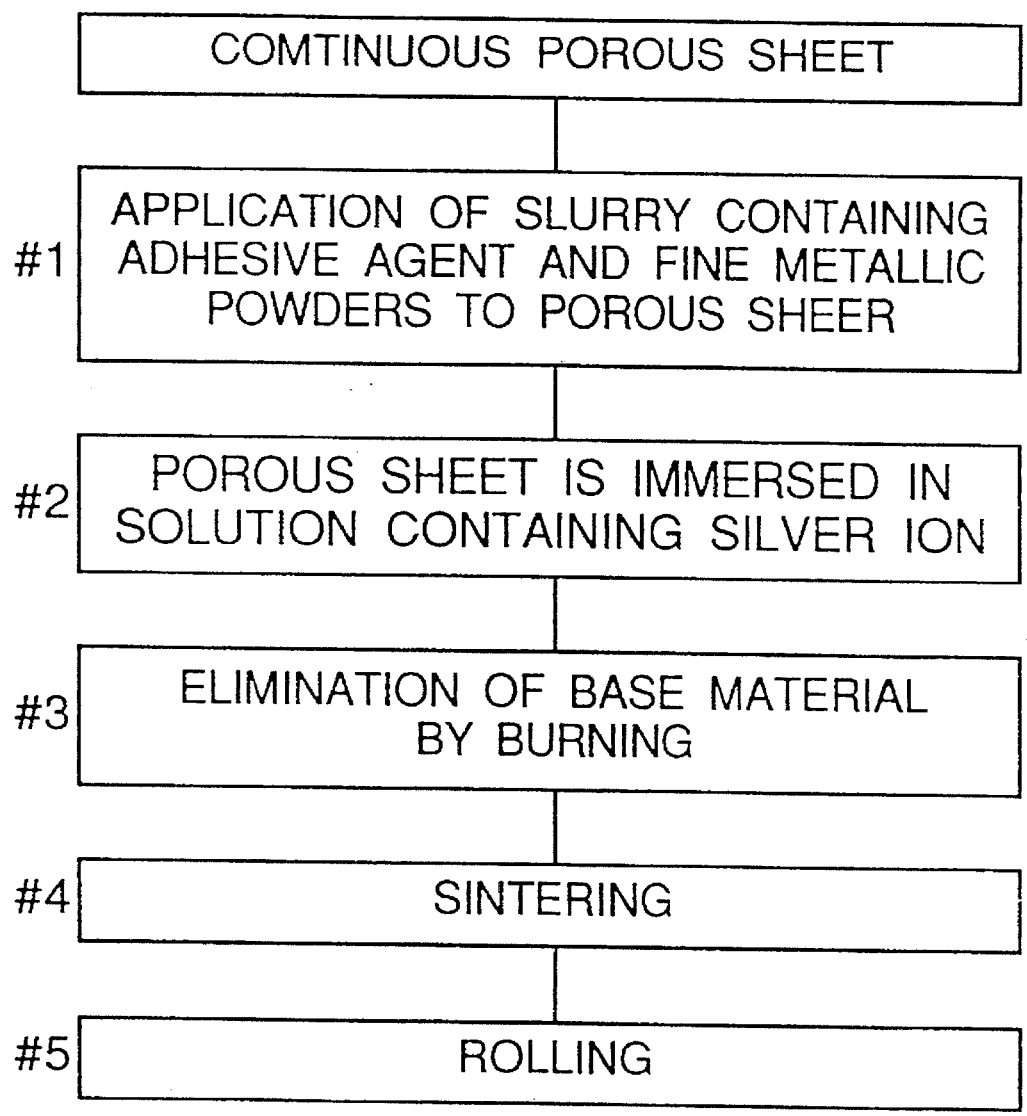
FIG. 20 is a flowchart showing the process of manufacturing a metallic porous sheet according to a sixth embodiment of the present invention.

A metallic porous sheet according to a sixth embodiment is described below with reference to FIG. 20 which is a flowchart showing the manufacturing process according to the sixth embodiment. At step #1, the slurry 40 containing fine metallic powders are applied to the porous sheet 1. At step #2, the porous sheet 1 is immersed in solution containing metallic ions same as that composing the fine metallic powders to be used, so that the ions are attracted to the fine metallic powders, and coated on the surface of the fine metallic powders and penetrate into the fine metallic powders. At step #3, the porous sheet 1 is heated to burn out the base material and adhesive agent from the framework. The conductive metallic layer formed by the fine metallic powders are sintered at step #4, and then, the sintered metallic powders are rolled at step #5.

Needless to say, the execution of the process to be performed at step #3 to burn out the base material and the adhesive agent may be omitted.

Needless to say, the processes to be performed at steps #2 through #5 of the fourth embodiment may be carried out between the steps #1 and #2 of the sixth embodiment as necessary.

Figure 26:
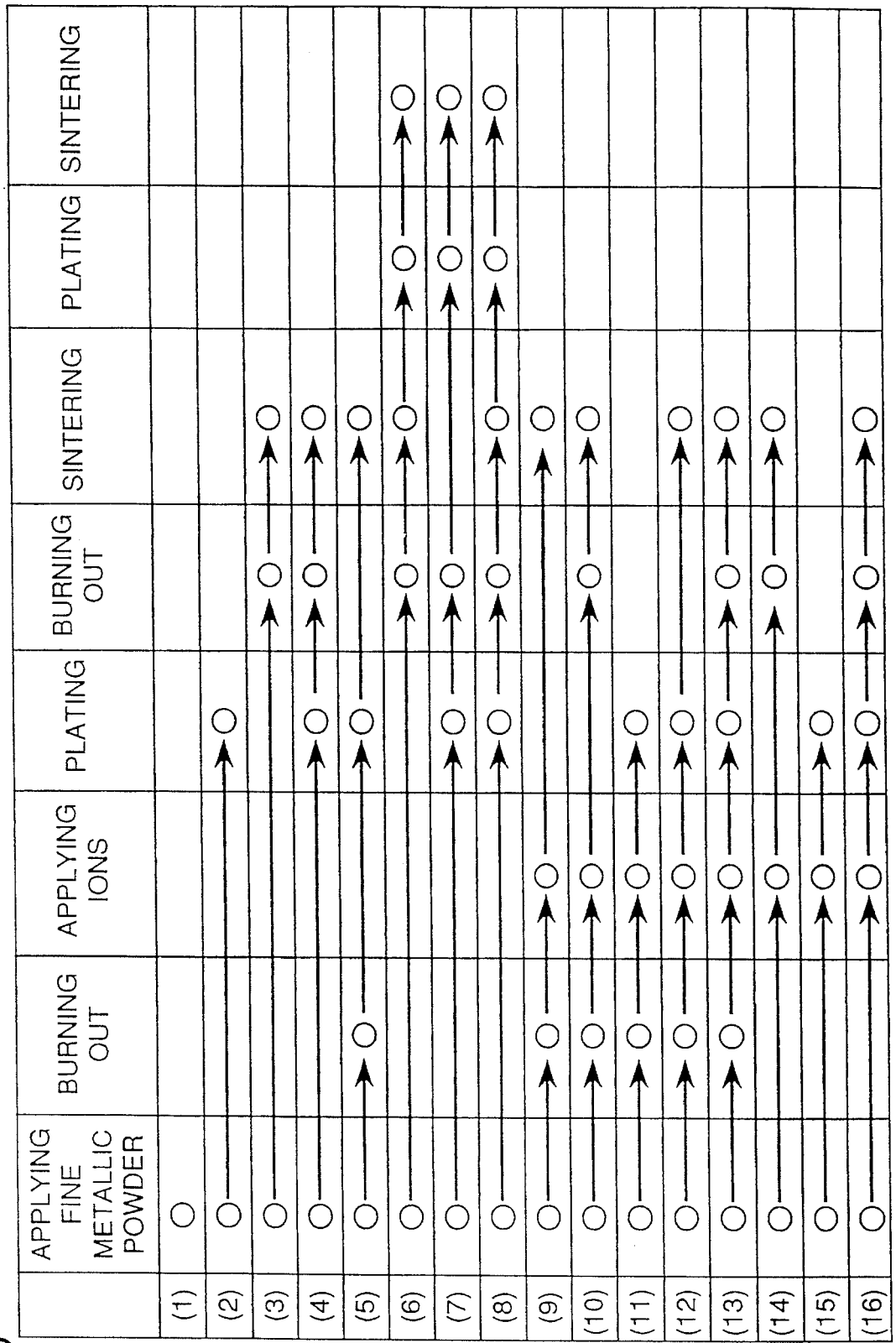
FIG. 26 is a diagram showing all processes of manufacturing the metallic porous sheet according to the present invention.

The metallic porous sheet of the present invention can be manufactured by various methods shown in FIG. 26. Namely, sixteen methods are used for manufacturing the metallic porous sheet of the present invention.

According to the present invention, three kinds of fine metallic powders different in configuration and size are used in the above-described embodiments. That, is, metallic powders are spread by mechanical process to form flake-shaped metallic powders, the thicknesses of which are 0.02–2.0 µm. The surface lengths of the longer sides of the flake-shaped metallic powders are 0.2–10.0 µm. Metallic powders are chemically treated to form ultrafine metallic powders, the diameters of the ultrafine metallic powders are 0.02–1.0 µm. Metallic powders are mechanically pulverized to form pulverized metallic powders, the diameters of the pulverized metallic powders are 1.0–6.0 µm. The fine metallic powders of the three kinds are appropriately combined with each other to form a metallic sheet having a high density. The metallic sheet composes the framework of a three-dimensional net-shaped porous sheet.

More specifically, as a first example, the framework of the three-dimensional net-shaped porous sheet is composed of a metallic sheet consisting of mixture of at least two of the three kinds of metallic powders, namely, the flake-shaped metallic powders, the ultrafine metallic: powders, and the pulverized metallic powders.

As a second example, the framework of the three-dimensional net-shaped porous sheet is composed of a metallic sheet formed by laminating one on the other a metallic sheet comprising at least two metallic layers each consisting of any one of the three kinds of metallic powders.

As a third example, the framework of the three-dimensional net-shaped porous sheet is composed of a metallic sheet formed by laminating, one on the other, a metallic layer consisting of at least two of the three kinds of metallic powders mixed with each other and a metallic layer or a plurality of metallic layers each consisting of any one of the three kinds of metallic powders.

It is preferable to dispose a metallic layer consisting of the flake-shaped metallic powders or a metallic layer containing the flake-shaped metallic powders on the outer side of the metallic layer formed by laminating a plurality of metallic layers one on the other.

Needless to say, the metallic sheets comprising the above-described metallic powders may be electroplated on the surface thereof.

As described in the above-described embodiments, the above-described metallic powders are applied to the surface of the porous sheet in the form of slurry or to binder coating the surface of the porous sheet. Both methods allow the metallic-powders to be attached to the surfaces, of the framework, defining pores inside the porous sheet.

It is possible to attach the metallic powders to the base material sheet at a high density by combining with each other two or three kinds of the flake-shaped metallic powders, the ultrafine metallic powders, and the pulverized metallic powders different from each other in size and configuration.

For example, the pulverized metallic powders of large diameters and the ultrafine metallic powders of small diameters are mixed with one other. As a result, the latter penetrates into gaps between the former. In this manner, the metallic sheet consisting of mixed powders can be attached to the base material of the metallic porous sheet at a high density.

If the surface of the metallic sheet is required to be smooth, a metallic layer consisting of the flake-shaped metallic powders is disposed on the outer side of the metallic sheet to be formed.

If the metallic sheet is required to be thick, it is preferable to interpose the pulverized metallic powders between metallic layers, consisting of the ultrafine metallic powders or the flake-shaped metallic powders, disposed on both sides of the metallic sheet to be formed.

The combination of the two or three kinds of metallic powders compensates demerits of one kind of metallic powders with merits of other kind of metallic powders, thus providing a metallic sheet appropriate for use.

Moreover, the combination of the three kinds of metallic powders can be easily accomplished.

That is, two or three kinds of metallic powders and binder are mixed with each other to apply the mixture thus formed to the base material.

In combining two kinds (three kinds) of metallic layers with each other, after mixture of a first kind of metallic powders and binder is applied to the base material to form a metallic layer, mixture of a second kind of metallic powders and binder is applied to the upper surface of the metallic layer.

After the binder is applied to the surface of the base material, mixture of two or three kinds of metallic powders or one kind of metallic powders is applied to the binder.

Embodiments of the three kinds of metallic powders are described below.

Figures 21A, 21B, 21C:
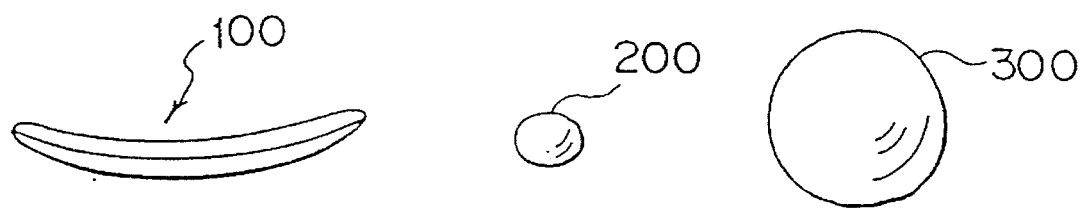
FIG. 21A, 21B and 21C are a schematic view showing fine metallic powders to be used in the present invention.

FIG. 21A shows flake-shaped metallic powders 100. FIG. 21B shows ultrafine metallic powders 200. FIG. 21C shows pulverized metallic powders 300.

The thicknesses of the flake-shaped metallic powders 100 are 0.02–2.0 µm. The surface lengths of longer sides of the flake-shaped metallic powders 100 are 0.2–10.0 µm. The flake-shaped metallic powders 100 has a large surface area and are squamous. The diameters of the ultrafine metallic powders 200 are 0.02–1.0 µm. The diameters of the pulverized metallic powders 300 are 1.0–6.0 µm.

The flake-shaped metallic powders 100 are formed as follows: Spherical metallic powders having diameters more than 1 µm formed by mechanical pulverization and a great number of spheres are put into a wet rotary container. The container is rotated for a predetermined period of time to press the spherical metallic powders and the spheres against one another. As a result, the metallic powders are spread and become flake-shaped (squamous).

Ceramic spheres are most favorable, but spheres made of zirconia, alumina or iron may be used. The diameters of the spheres are set to approximately 10 mm.

In the above-described method of manufacturing the flake-shaped metallic powders 100, the spherical metallic powders in the container are brought into contact with the ceramic spheres under pressure, thus being stretched or spread gradually. The metallic powders are treated in wet atmosphere in the container after they are mixed with water and solvent. Therefore, metallic powders attach to the spheres and are thus prevented from being blown upward. In this manner, they can be reliably spread.

The ultrafine metallic powders 200 are 0.02–1.0 μm in diameter and cannot be formed mechanically by the conventional pulverizing method. Thus, they are formed by chemical treatment.

That is, crystal powders of metallic salt are dissolved in water solution to ionize the metallic ions and salt ions. Then, metallic ions are reduced by reducing agent added to the water solution, thus being precipitated as ultrafine metallic powders having diameters of 0.02–1.0 μm. In this treatment, the mixture is stirred so that the metallic ions are attracted to anions in the reducing reaction. As a result, the ultrafine metallic powders having diameters of 0.02–1.0 μm precipitate with the salt attached to the periphery thereof. The mixture is stirred at a high speed to prevent the ultrafine metallic powders from being connected with each other due to the stirring. Thus, they can be prevented from being conglomerated and hence, the diameter of 0.02–1.0 μm can be maintained.

The pulverized metallic powders 300 having the diameter of 1.0–6.0 μm are mechanically formed by the conventional mechanical method.

The flake-shaped metallic powders 100, the ultrafine metallic powders 200, and the pulverized metallic powders 300 have advantage, respectively. The flake-shaped metallic powders 100 are likely to overlap one another and have a large surface area, respectively. Thus, they are conductive and have a low resistance. The ultrafine metallic powders 200 can be attached to the base material at a high density. In addition, when the ultrafine metallic powders 200 are combined with the flake-shaped metallic powders 100 and the pulverized metallic powders 300, the ultrafine metallic powders 200 can be permeated into gaps between the flake-shaped metallic powders 100 and the pulverized metallic powders 300. Because the pulverized metallic powders 300 are large in diameter, they can form a thick metallic layer on the base material.

The three kinds of metallic powders are appropriately combined with each other and mixed with binder to form mixture into slurry, as described previously. The slurry is applied, by roll coating method, screen coating method, spray method, doctor coating method or the like, to the surface of a three-dimensional net-shaped porous sheet consisting of a foamed sheet, a nonwoven sheet, a mesh sheet or a plurality of sheets layered one on the other by combining at least two of the above three types of sheets with each other.

Thereafter, the porous sheet and the binder are eliminated by burning, and the conductive metallic layer comprising of fine metallic powders are sintered to form the framework of the three-dimensional net-shaped porous sheet.

Figure 22:
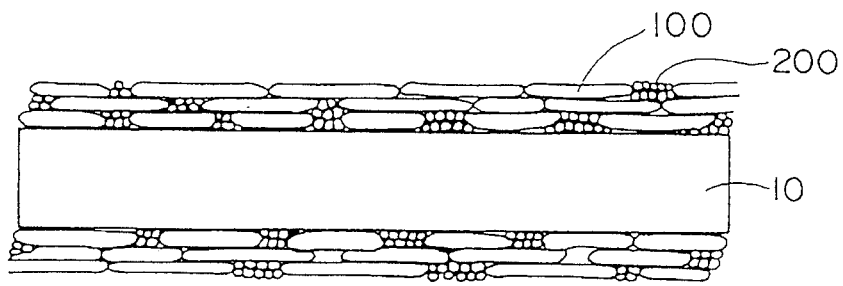
FIG. 22 is a sectional view showing an example of the arrangement of fine metallic powders.

For example, in forming a metallic sheet comprising the flake-shaped metallic powders 100 and the ultrafine metallic powders 200 mixed with each other shown in FIG. 22, a porous sheet 10 is transported into the tank 41 storing binder, the flake-shaped metallic powders 100, and the ultrafine metallic powders 200 mixed with each other so that the slurry 40 is applied to the upper and lower surfaces of the porous sheet 10 and surfaces, of the framework, defining pores in the porous sheet 10 by roll coating method shown in FIG. 14.

Then, a metallic-porous sheet 8 is manufactured by the methods adopted in the above-described embodiments and shown in FIG. 26. The metallic porous sheet 8 comprises the flake-shaped metallic powders 100 overlapping each other and the ultrafine metallic powders 200 which have penetrated into gaps between the flake-shaped metallic powders 100, as shown in FIG. 22. in this manner, the metallic powders can be attached to the surface of the porous sheet 10.

Figure 23A:
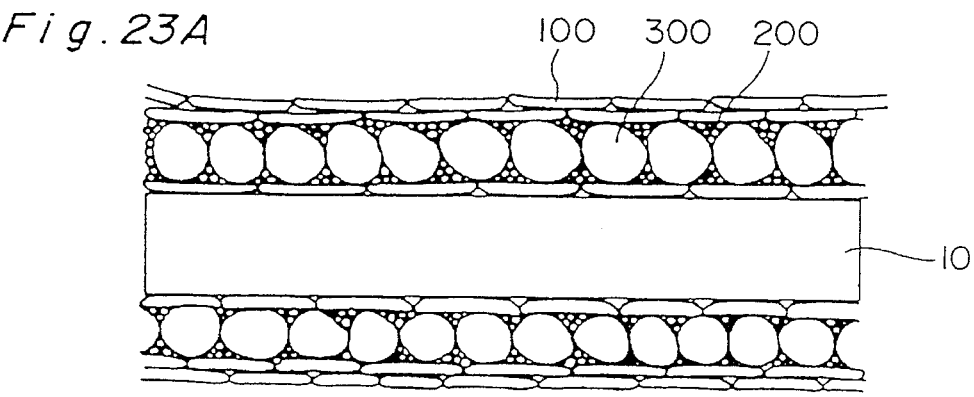
FIGS. 23A, 23B, and 23C are sectional views showing another example of the arrangement of fine metallic powders.

Referring to FIG. 23A, initially, the flake-shaped metallic powders 100 are applied to the upper and lower sides of the porous sheet 10, and then, mixture of the ultrafine metallic powders 200 and the pulverized metallic powders 300 is applied to the flake-shaped metallic powders 100. Then, the flake-shaped metallic powders 100 are applied to the mixture of the ultrafine metallic powders 200 and the pulverized metallic powders 300 again. Burning out the porous sheet 10 from the mixture, a resulting metallic sheet has the flake-shaped metallic powders 100 both on the upper and lower sides thereof.

Figure 23B:
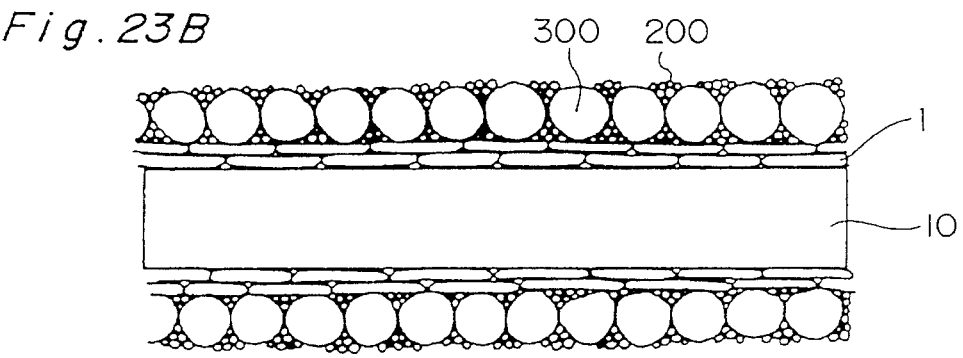

Referring to FIG. 23B, the flake-shaped metallic powders 100 are applied to the upper and lower sides of the porous sheet 10, and then, mixture of the ultrafine metallic powders 200 and the pulverized metallic powders 300 is applied to the flake-shaped metallic powders 100. Burning out the porous sheet 10 from the mixture, a resulting metallic sheet has the flake-shaped metallic powders 100 in surfaces, of the framework, defining pores formed in the porous sheet 10.

Figure 23C:
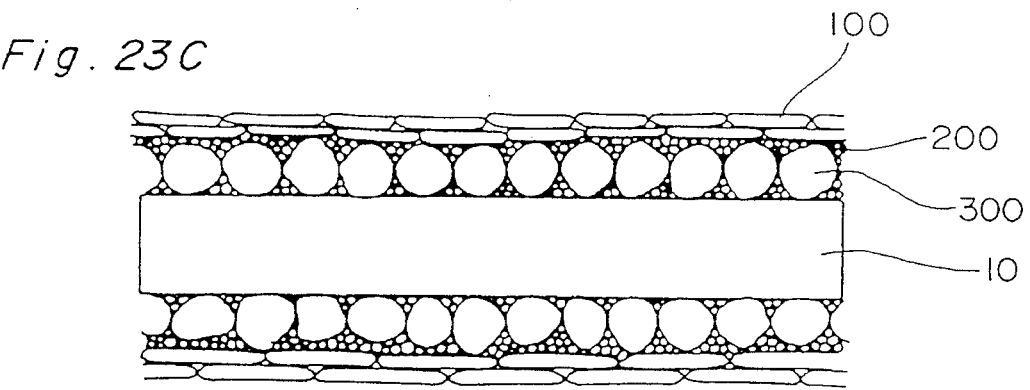

The arrangement of metallic layers shown in FIG. 23C is opposite that shown in FIG. 23B.

The pulverized metallic powders 300 have large diameters. Thus, the pulverized metallic powders 300 are preferably used to form a thick metallic layer, but gaps are formed between the pulverized metallic powders 300. Accordingly, it is preferable to mix the pulverized metallic powders 300 and the ultrafine metallic powders 200 with each other as described above, because the ultrafine metallic powders 200 penetrate into gaps between the pulverized metallic powders 300.

FIGS. 24A through 24D show examples of metallic sheets comprising metallic layers consisting of the flake-shaped metallic powders 100 and metallic layers consisting of the ultrafine metallic powders 200 laminated one on the other.

Figure 24B:
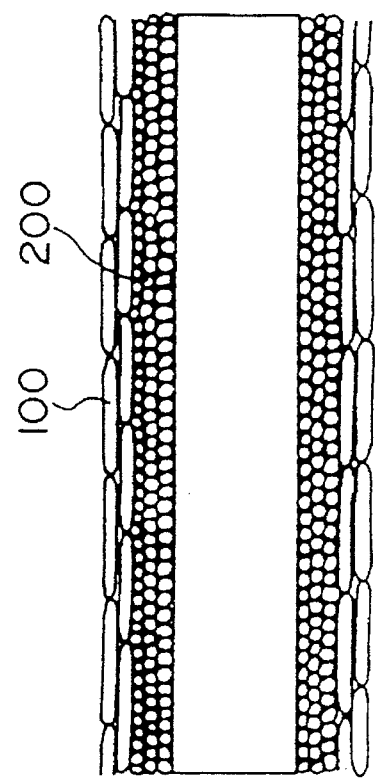
Figure 24D:
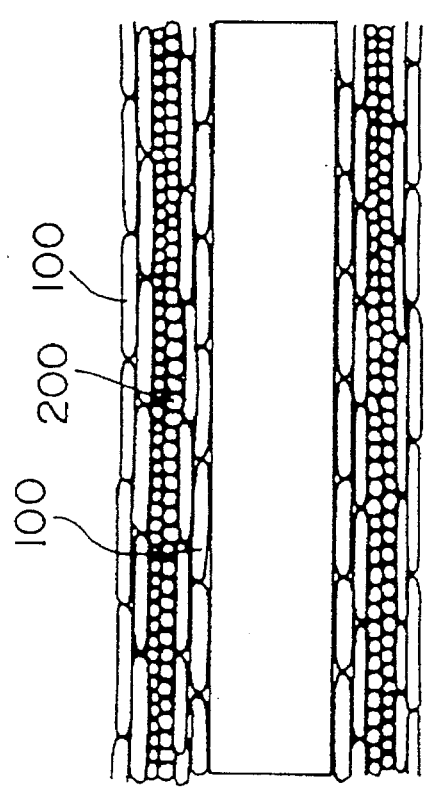
Figure 24A:
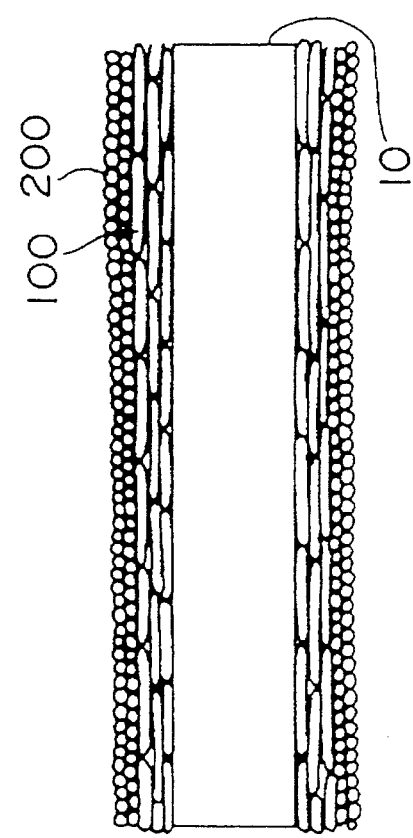
Figure 24C:
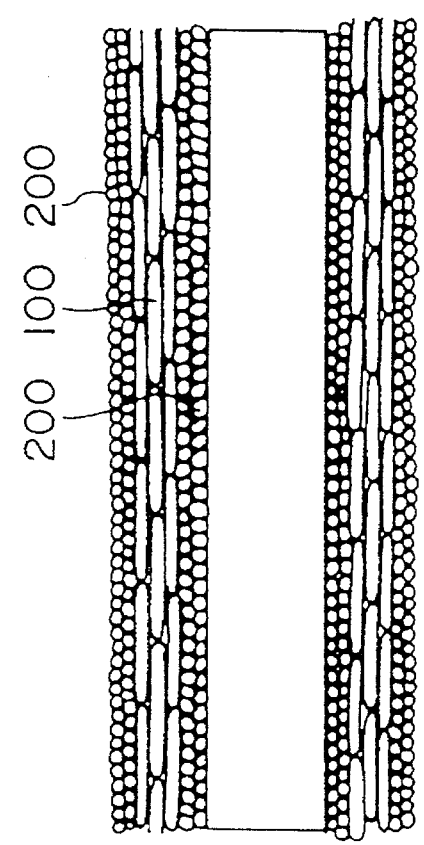
Figure 25A:
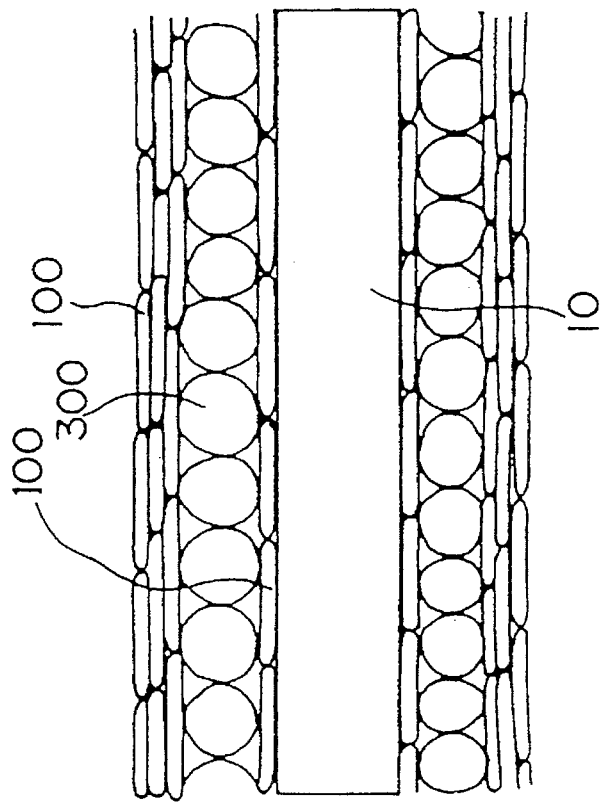
FIGS. 25A and 25B are sectional views showing further example of the arrangement of fine metallic powders.
Figure 25B:
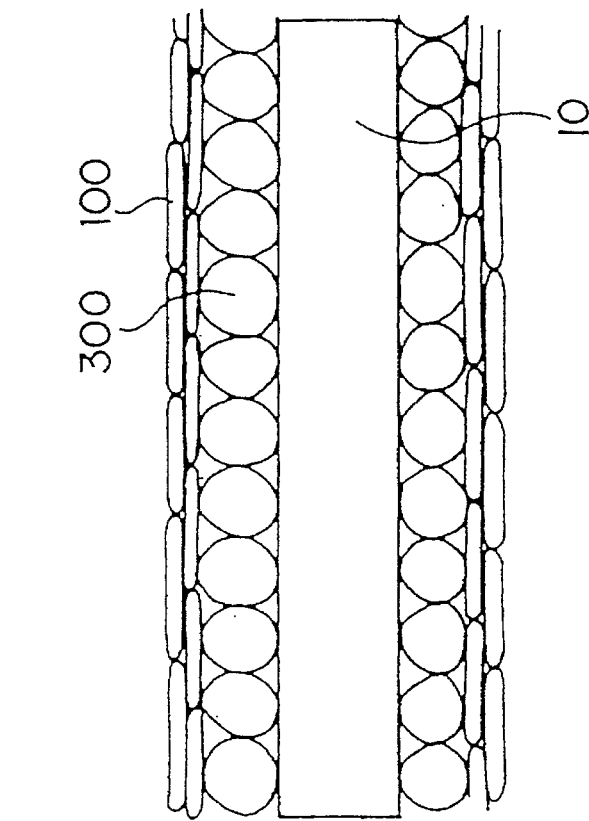

FIGS. 25A and 24B show examples of metallic sheets comprising metallic layers consisting of the flake-shaped metallic powders 100 and metallic layers consisting of the pulverized metallic powders 300 laminated one on the other.

Although not shown in the drawings, a metallic sheet may consist of a metallic layer composed of mixture of the ultrafine metallic powders 200 and the pulverized metallic powders 300.

It is preferable to mix the ultrafine metallic powders 200, the pulverized metallic powders 300, and binder at 10–99%, 1–90%, and 5–50%, respectively.

EXPERIMENT 9

The ultrafine metallic powders 200 and the pulverized metallic powders 300 were mixed with each other to form a three-dimensional net-shaped metallic porous sheet as follows:

Mixture of 600 parts of nickel ultrafine powders, 400 parts of pulverized nickel powders, 140 parts of acrylic binder, 680 parts of $H_2O$, 40 parts of 5% MC solution, and two parts of dispersing agent were mixed with one another to form slurry, viscosity of which was 6,200 cps. A foamed sheet was passed through the gap between coating rolls and then, with an air knife, the slurry thus formed was applied to surfaces, of the framework, defining pores formed in the foamed sheet. The foamed sheet was dried at 150° C. for one minute. As a result, the weight of a conductive layer comprising a nickel layer and the slurry which attached to the foamed sheet was 125 g/m². Then, the slurry was burned out. As a result, the weight of the remainder (nickel) was 112.5 g/m². As a result of a second application of the slurry to the foamed sheet and the processes similar to the first application, the amount of the conductive metallic layer which attached to the foamed sheet was 266 g/m². As a result of a third application of the slurry to the foamed sheet and the processes similar to the first application, the amount of the conductive metallic layer 5 which attached to the porous sheet 1 was 480 g/m², whereas the weight of nickel powder was 432 g/m².

The porous sheet, or the foamed sheet was heated at 800° C. for three minutes to be burned out. Then, sintering was performed in reducing atmosphere at 1,000° C. for 30 minutes. The porous sheet was passed through the gap of 1.55 mm between skin path rolls. The thickness of a metallic porous sheet thus obtained was 1.55 mm.

The metallic porous sheet composed of nickel fine powders may be electroplated. In this case, it is preferable to deposit metal in about 10% of a predetermined total metallic layer on the nickel layer.

As described above, it is possible to attach fine metallic powders to the base material at a high density, the metallic sheet is formed by combining with each other two or three kinds of the flake-shaped metallic powders, the ultrafine metallic powders, and the pulverized metallic powders different from each other in size and configuration.

For example, the pulverized metallic powders of large diameters and the ultrafine metallic powders of small diameters are mixed with one other. As a result, the latter penetrates into gaps between the former. In this manner, the metallic sheet consisting of mixed powders can be attached to the base material at a high density.

If the surface of the metallic sheet is required to be smooth, a metallic layer consisting of the flake-shaped metallic powders is disposed on the outer side of the metallic sheet to be formed.

If the metallic sheet is required to be thick, it is preferable to interpose the pulverized metallic powders between metallic layers, consisting of the ultrafine metallic powders or the flake-shaped metallic powders, disposed on both sides of the metallic sheet to be formed.

The combination of the two or three kinds of metallic powders compensates demerits of one kind of metallic powders with merits of other kind of metallic powders, thus providing a metallic sheet appropriate for use.

Moreover, the combination of the three kinds of metallic powders can be easily accomplished.

That is, two or three kinds of metallic powders and binder are mixed with each other to apply the mixture.

In combining two kinds (three kinds) of metallic layers with each other, after mixture of a first kind of metallic powders and binder is applied to the base material to form a metallic layer, mixture of a second kind of metallic powders and binder is applied to the upper surface of the metallic layer.

After the binder is applied to the surface of the base material, mixture of two or three kinds of metallic powders or one kind of metallic powders is applied to the binder.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of manufacturing a metallic porous sheet comprising pores surrounded by a three-dimensional net-shaped framework comprising the steps of:

forming a conductive metallic layer by applying fine metallic powders to all surfaces of a three-dimensional net-shaped porous sheet, including the surfaces which define the pores, by using an adhesive agent;

forming a metallic plated layer on the conductive metallic layer by electroplating the surface thereof, heating the conductive metallic layer and the metallic plated layer to burn out the porous sheet and adhesive agent, and then continuously sintering the conductive metallic layer and the metallic plated layer.

2. The method of manufacturing a metallic porous sheet as defined in claim 1, further comprising the steps of:

electroplating the surface of the metallic plated layer after said sintering, and thereafter continuously sintering said metallic plated layer a second time.

3. The method of manufacturing a metallic porous sheet as defined in claim 1, further comprising the steps of:

heating the conductive metallic layer to burn out the porous sheet and adhesive agent, continuously electroplating the conductive metallic layer to form the metallic plated layer, and then sintering the conductive metallic layer and the metallic plated layer.

4. A method of manufacturing a metallic porous sheet comprising pores surrounded by a three-dimensional net-shaped framework comprising the steps of:

applying an adhesive agent to a three-dimensional net-shaped porous sheet;

forming a conductive metallic layer by applying fine metallic powders to all surfaces of the adhesive agent on the porous sheet to form pores surrounded by a three-dimensional net-shaped framework of the conductive metallic layer;

heating the conductive metallic layer to burn out the porous sheet and adhesive agent;

immersing the conductive metallic layer in a solution comprising metallic ions wherein the metallic ions are attracted to the fine metallic powders of the conductive metallic layer; and sintering the conductive metallic layer.

5. A method of manufacturing a metallic porous sheet comprising pores surrounded by a three-dimensional net-shaped framework comprising the steps of:

applying an adhesive agent to a three-dimensional net-shaped porous sheet;

forming a conductive metallic layer by applying fine metallic powders to all surfaces of the adhesive agent on the porous sheet to form pores surrounded by a three-dimensional net-shaped framework of the conductive metallic layer;

heating the conductive metallic layer to burn out the porous sheet and adhesive agent;

immersing the conductive metallic layer in a solution comprising metallic ions wherein the metallic ions are attracted to the fine metallic powders of the conductive metallic layer;

electroplating the conductive metallic layer to form a metallic plated layer thereon; and sintering the conductive metallic layer and the metallic plated layer.

6. A method of manufacturing a metallic porous sheet comprising pores surrounded by a three-dimensional net-shaped framework comprising the steps of:

applying an adhesive agent to a three-dimensional net-shaped porous sheet;

forming a conductive metallic layer by applying fine metallic powders to all surfaces of the adhesive agent on the porous sheet to form pores surrounded by a three-dimensional net-shaped framework of the metallic conductive layer;

immersing the conductive metallic layer in a solution comprising metallic ions wherein the metallic ions are attracted to the fine metallic powders of the conductive metallic layer;

heating the conductive metallic layer to burn out the porous sheet and adhesive agent; and sintering the conductive metallic layer.

7. A method of manufacturing a metallic porous sheet comprising pores surrounded by a three-dimensional net-shaped framework comprising the steps of:

applying an adhesive agent to a three-dimensional net-shaped porous sheet;

forming a conductive metallic layer by applying fine metallic powders to all surfaces of the adhesive agent on the porous sheet to form pores surrounded by a three-dimensional net-shaped framework of the conductive metallic layer;

immersing the conductive metallic layer in a solution comprising metallic ions wherein the metallic ions are attracted to the fine metallic powders of the conductive metallic layer;

electroplating the conductive metallic layer to form a metallic plated layer thereon;

heating the conductive metallic layer and the metallic plated layer to burn out the porous sheet and adhesive agent; and sintering the conductive metallic layer and the metallic plated layer.

8. A method of manufacturing a metallic porous sheet comprising pores surrounded by a three-dimensional net-shaped framework comprising the steps of:

forming a conductive metallic layer by applying fine metallic powders to all surfaces of a three-dimensional net-shaped porous sheet, including the surfaces which define the pores, by using an adhesive agent;

heating the conductive metallic layer to burn out the porous sheet; and continuously sintering the conductive metallic layer.

9. The method of manufacturing a metallic porous sheet as defined in claim 1, wherein the three-dimensional net-shaped porous sheet consists of a foamed sheet, a nonwoven sheet, a mesh sheet or a plurality of sheets layered one on the other by combining at least two of the foamed sheet, the nonwoven sheet, and the mesh sheet with each other.

10. The method of manufacturing a metallic porous sheet as defined in claim 1, wherein the fine metallic powders are subjected to activation and replacement treatments before or after the fine metallic powders are applied to the porous sheet.

11. The method of manufacturing a metallic porous sheet as defined in claim 1, wherein the conductive metallic layer is formed by applying an organic adhesive agent to the porous sheet and applying the fine metallic powders to the organic adhesive agent.

12. The method of manufacturing a metallic porous sheet as defined in claim 1, wherein the conductive metallic layer is formed by applying a slurry comprising the fine metallic powders and an organic adhesive agent mixed with each other to all the surfaces including the surface of the porous sheet.

13. The method of manufacturing a metallic porous sheet as defined in claim 12, wherein the conductive metallic layer is formed by applying a slurry comprising the fine metallic powders and an organic adhesive agent mixed with each other to all the surfaces including the surface of the porous sheet.

14. The method of manufacturing a metallic porous sheet as defined in claim 11, wherein the conductive metallic layer is formed by applying a slurry comprising the fine metallic powders and an organic adhesive agent mixed with each other to all the surfaces including the surface of the porous sheet.

15. The method of manufacturing a metallic porous sheet as defined in claim 5, wherein the conductive metallic layer is formed by applying a slurry comprising the fine metallic powders and an organic adhesive agent mixed with each other to all the surfaces including the surface of the porous sheet.

16. The method of manufacturing a metallic porous sheet as defined in claim 6, wherein the conductive metallic layer is formed by applying a slurry comprising the fine metallic powders and an organic adhesive agent mixed with each other to all the surfaces including the surface of the porous sheet.

17. The method of manufacturing a metallic porous sheet as defined in claim 7, wherein the conductive metallic layer is formed by applying a slurry comprising the fine metallic powders and an organic adhesive agent mixed with each other to all the surfaces including the surface of the porous sheet.

18. The method of manufacturing a metallic porous sheet as defined in claim 1, wherein the conductive metallic layer is formed by applying a slurry comprising fine metallic powders, an organic adhesive agent and an ion absorbent mixed with each other to all the surfaces including the surface of the porous sheet.

19. The method of manufacturing a metallic porous sheet as defined in claim 3, wherein the conductive metallic layer is formed by applying a slurry comprising fine metallic powders, an organic adhesive agent and an ion absorbent mixed with each other to all the surfaces including the surface of the porous sheet.

20. The method of manufacturing a metallic porous sheet as defined in claim 1, wherein the size of the fine metallic powders is 6.0 µm or less.

21. The method of manufacturing a metallic porous sheet as defined in claim 8, wherein the size of the fine metallic powders is 6.0 µm or less.

* * * * *